(12) United States Patent
Konishi

(10) Patent No.: US 11,157,222 B2
(45) Date of Patent: Oct. 26, 2021

(54) IMAGE FORMING SYSTEM AND POST-PROCESSING DETERMINATION METHOD

(71) Applicant: Konica Minolta, Inc., Tokyo (JP)

(72) Inventor: Hiroyuki Konishi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/818,291

(22) Filed: Mar. 13, 2020

(65) Prior Publication Data

US 2020/0296241 A1 Sep. 17, 2020

(30) Foreign Application Priority Data

Mar. 14, 2019 (JP) .............................. JP2019-046724

(51) Int. Cl.
  *G06F 3/12* (2006.01)
  *H04N 1/00* (2006.01)
(52) U.S. Cl.
  CPC .......... *G06F 3/1255* (2013.01); *G06F 3/1256* (2013.01); *H04N 1/0049* (2013.01); *H04N 1/00639* (2013.01)
(58) Field of Classification Search
  CPC combination set(s) only.
  See application file for complete search history.

(56) References Cited

U.S. PATENT DOCUMENTS

2006/0238786 A1* 10/2006 Sakura ................. G06F 3/1285
                                                                 358/1.9

FOREIGN PATENT DOCUMENTS

JP      201403.5510 A    2/2014
JP      2014232503 A    12/2014

\* cited by examiner

*Primary Examiner* — Barbara D Reinier
(74) *Attorney, Agent, or Firm* — Cantor Colburn LLP

(57) ABSTRACT

An image forming system includes: an image forming apparatus; a post-processing apparatus that includes post-processors corresponding to at least two post-processes and perform the at least two post-processes stepwise on paper on which an image is formed by the image forming apparatus; a setting receiver that receives post-processing settings corresponding to the at least two post-processes; and a hardware processor that determines whether or not the at least two post-processes are executable based on the post-processing settings corresponding to the at least two post-processes and that, in a case where it is determined that the at least two post-processes are not executable, when a post-processing setting corresponding to one of the at least two post-processes is a setting including numerical value input, provides notification regarding a numerical value input setting change in the post-processing setting corresponding to the one post-processing.

11 Claims, 21 Drawing Sheets

FIG.3

| POST-PROCESSING | POST-PROCESSABLE WIDTH | POST-PROCESSABLE LENGTH | STANDARD PAPER CONDITIONS/STANDARD PAPER NAME |
|---|---|---|---|
| STAPLE | 203.0mm – 331.0mm | 139.0mm – 488.0mm | × |
| PUNCH | 297.0mm | 210.0mm | ○ / A4L |
|  | 297.0mm | 420.0mm | ○ / A3S |
|  | 257.0mm | 182.0mm | ○ / B5L |
|  | 257.0mm | 364.0mm | ○ / B4S |
|  | ... | ... | ... |
| Z-FOLDING | 210.0mm – 305.0mm | 279.0mm – 458.0 mm | × |
| ... | ... | ... | ... |

MACHINE STATE | JOB LIST | READ | SAVE | COPY | SCAN | ?

PLEASE SELECT STAPLE POSITION

SET NUMBER 0012  DOCUMENT COUNTER 0
NUMBER OF RESERVED JOBS 0

53A — CORNER STAPLE
- LEFT CORNER
- RIGHT CORNER

53B — TWO-POINT STAPLE
- LEFT
- TOP
- RIGHT

STAPLE INTERVAL
- WIDE
- SLIGHTLY NARROW
- NARROW

FUNCTION OFF | CANCEL | OK (B31)

53

IMAGE FORMING SYSTEM AND POST-PROCESSING DETERMINATION METHOD

CROSS-REFERENCE TO RELATED APPLICATIONS

The present invention claims priority under 35 U.S.C. § 119 to Japanese Patent Application No. 2019-046724 filed on Mar. 14, 2019, the entire content of which is incorporated herein by reference.

BACKGROUND

Technological Field

The present invention relates to an image forming system and a post-processing determination method.

Description of the Related Art

A post-processing apparatus that executes post-processing, such as stapling processing, folding processing, punching processing, and cutting processing, on paper on which an image is formed by an image forming apparatus has been used in the related art. When executing a plurality of post-processes, there is a case where the execution is impossible (prohibited) due to a relationship between the post-processes. If the execution is impossible due to a combination of post-processes, the user needs to perform an operation such as canceling any of the set post-processes, changing the post-processing content, or changing the paper setting.

Regarding the determination of the possibility of post-processing, an image forming system has been proposed that, when the first post-processing including a paper size change and the second post-processing different from the first post-processing are set, calculates the paper size after the first post-processing from the fed paper size and determines whether or not the set post-processing is executable based on the paper size after the first post-processing and the processable paper size in the second post-processing (refer to JP 2014-035510 A).

A technique for prompting a user to resolve a prohibition relationship when there is a function causing a prohibition relationship between the print setting associated with a print job and the device-side print setting set in an image forming apparatus has been proposed (refer to JP 2014-232503 A).

SUMMARY

However, in a case where it is determined that a combination of a plurality of post-processes are not executable and the setting of the post-processes is canceled or changed, there is a problem that it is difficult to understand which post-processing should be canceled or how the post-processing content should be changed to release the prohibition.

In addition, changes in post-processing contents, such as changes in staple positions and punching positions and changes in the number of staples and punch holes, often cause results that are significantly different from the finish desired by the user.

In particular, when a part of paper is cut by a slitter or a trimmer and another post-processing is set for the paper after the paper size is changed, another post-processing can or cannot be executed according to the cutting amount of the paper. It has been difficult for the user to know how much cutting is possible or how much cutting is required in combination with another post-processing.

For example, in a case where it is determined that post-processing is not executable in a state in which cutting processing and stapling processing at both ends in the width direction of paper are set, if the prohibition is released by reducing the cutting amount in the cutting processing by approximately 0.1 mm, it is considered that changing the cutting amount in the cutting processing is closer to the finish desired by the user than canceling the post-processing (cutting and stapling) or changing the paper setting.

The invention has been made in view of the aforementioned problems in the related art, and an object thereof is to propose an appropriate prohibition releasing method when there is a prohibition relationship between a plurality of set post-processes.

To achieve at least one of the abovementioned objects, according to an aspect of the present invention, an image forming system reflecting one aspect of the present invention comprises: an image forming apparatus; a post-processing apparatus that includes post-processors corresponding to at least two post-processes and perform the at least two post-processes stepwise on paper on which an image is formed by the image forming apparatus; a setting receiver that receives post-processing settings corresponding to the at least two post-processes; and a hardware processor that determines whether or not the at least two post-processes are executable based on the post-processing settings corresponding to the at least two post-processes and that, in a case where it is determined that the at least two post-processes are not executable, when a post-processing setting corresponding to one of the at least two post-processes is a setting including numerical value input, provides notification regarding a numerical value input setting change in the post-processing setting corresponding to the one post-processing.

To achieve at least one of the abovementioned objects, according to another aspect of the present invention, a post-processing determination method reflecting one aspect of the present invention is a post-processing determination method in an image forming system including an image forming apparatus and a post-processing apparatus that include post-processors corresponding to at least two post-processes and perform the at least two post-processes stepwise on paper on which an image is formed by the image forming apparatus. The post-processing determination method comprises: receiving post-processing settings corresponding to the at least two post-processes; determining whether or not the at least two post-processes are executable based on the post-processing settings corresponding to the at least two post-processes; and, in a case where it is determined that the at least two post-processes are not executable, when a post-processing setting corresponding to one of the at least two post-processes is a setting including numerical value input, providing notification regarding a numerical value input setting change in the post-processing setting corresponding to the one post-processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein:

FIG. 3 is an example of a post-processing determination table;

FIG. 11 is an example of a staple setting screen;

DETAILED DESCRIPTION OF THE EMBODIMENTS

Hereinafter, embodiments of the present invention will be described in detail with reference to the drawings. However, the scope of the invention is not limited to the disclosed embodiments. The scope of the invention is not limited to the illustrated examples.

First Embodiment

Figure 1:
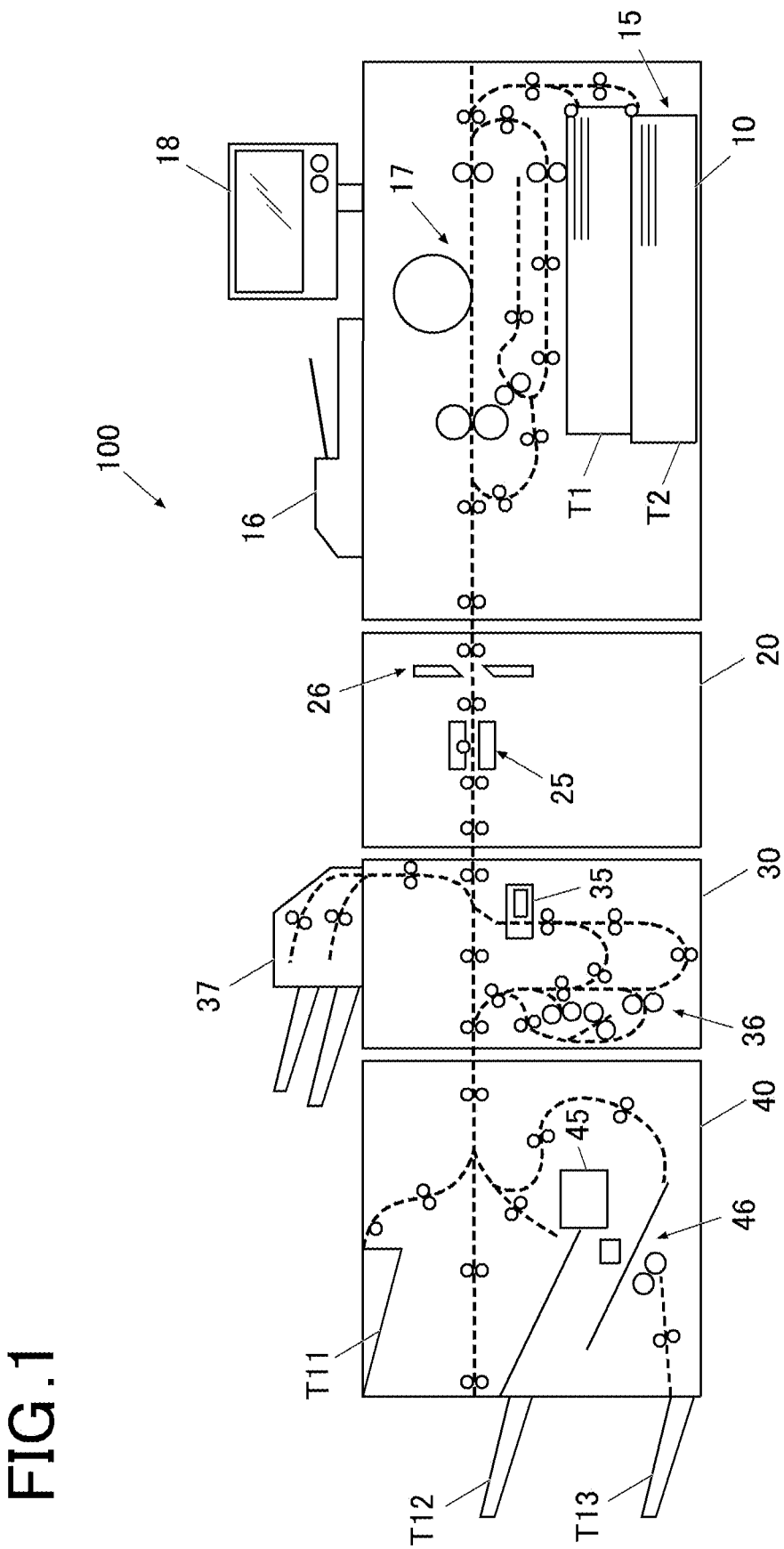
FIG. 1 is a system configuration diagram of an image forming system according to a first embodiment of the invention.
Figure 2:
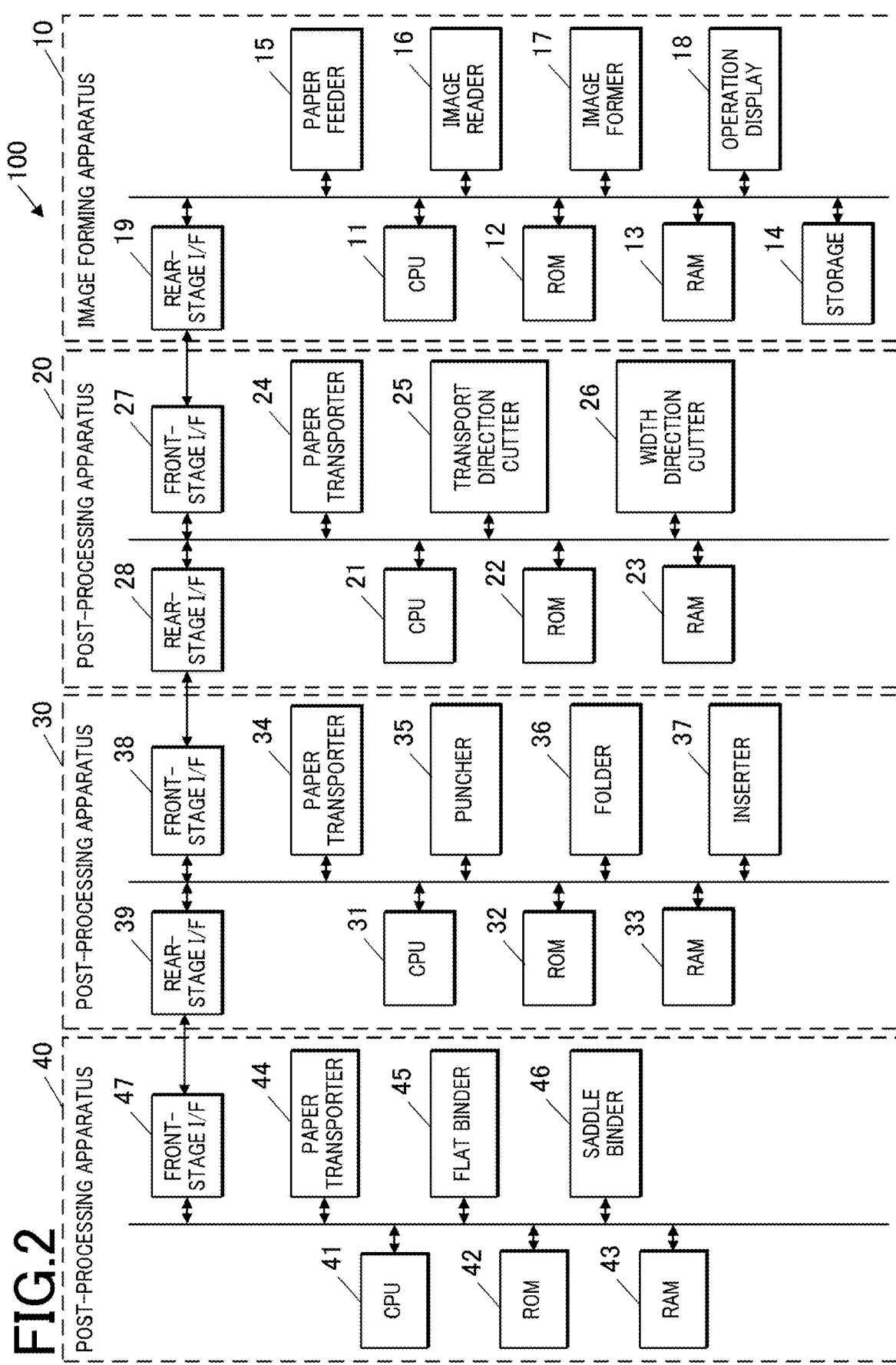
FIG. 2 is a block diagram illustrating the functional configuration of the image forming system.

FIG. 1 is a system configuration diagram of an image forming system 100 according to a first embodiment of the invention. FIG. 2 is a block diagram illustrating the functional configuration of the image forming system 100.

The image forming system 100 is configured to include an image forming apparatus 10 that forms an image on paper and post-processing apparatuses 20, 30, and 40 that perform post-processing on the paper on which an image is formed by the image forming apparatus 10. The post-processing apparatus 20 is connected to the image forming apparatus 10, the post-processing apparatus 30 is connected to the post-processing apparatus 20, and the post-processing apparatus 40 is connected to the post-processing apparatus 30.

The image forming apparatus 10 forms an image on paper, and transports the paper after the image formation to the post-processing apparatus 20.

The image forming apparatus 10 includes a central processing unit (CPU) 11 (hardware processor), a read only memory (ROM) 12, a random access memory (RAM) 13, a storage 14, a paper feeder 15, an image reader 16, an image former 17, and an operation display 18 (setting receiver), a rear-stage interface (I/F) 19, and the like.

The CPU 11 reads a program stored in the ROM 12 and loads the program to the RAM 13, and controls the operation of each unit of the image forming apparatus 10 in cooperation with the program.

The ROM 12 is configured by a nonvolatile semiconductor memory or the like, and stores a system program, various processing programs that can be executed on the system program, various kinds of data, and the like.

The RAM 13 is configured by a volatile semiconductor memory or the like, and forms a work area where programs, input or output data, parameters, and the like read from the ROM 12 are temporarily stored in various kinds of processing executed by the CPU 11.

The storage 14 is configured by a hard disk drive (HDD), a nonvolatile semiconductor memory, or the like, and stores various kinds of data. For example, the storage 14 stores information of post-processors included in the respective post-processing apparatuses 20, 30, and 40 or the connection order of the post-processing apparatuses 20, 30, and 40.

The storage 14 stores a post-processing determination table 141 illustrated in FIG. 3. In the post-processing determination table 141, a post-processable width, a post-processable length, and standard paper conditions are associated for each post-processing. The post-processable width is a paper width (length in a direction perpendicular to the paper transport direction) at which post-processing as a determination target is executable. The post-processable length is a paper length (length in the paper transport direction) at which post-processing as a determination target is executable. The standard paper conditions are information (○/X) indicating whether or not post-processing as a determination target is post-processing allowed only for the standard paper. When the standard paper conditions are ○, the post-processing determination table 141 also includes the name of the standard paper corresponding to the post-processable width and the post-processable length.

The paper feeder 15 supplies paper stored in paper feed trays T1 and T2 to the image former 17.

The image reader 16 reads a document and generates image data. More specifically, the image reader 16 reads reflected light, which is reflected by the document after emission from the light source, using a charge coupled device (CCD) image sensor or the like. The image former 17 forms an image on the paper.

The image former 17 charges a photoconductor with a charger, forms an electrostatic latent image by exposing and scanning the photoconductor with a laser beam emitted from an exposer based on image data, develops the electrostatic latent image with toner using a developer, transfers a toner image onto paper using a transferrer, and fixes the toner image on the paper using a fixer.

The operation display 18 is configured by a liquid crystal display (LCD), and includes a display for displaying various screens and an operation interface configured by various keys or a touch panel stacked on the display. The operation display 18 outputs an operation signal input by a touch operation or a key operation to the CPU 11.

The rear-stage I/F 19 transmits and receives data to and from the post-processing apparatus 20.

The post-processing apparatus 20 is a cutting machine that performs cutting processing on the paper. The post-processing apparatus 20 performs cutting processing on the paper transported from the image forming apparatus 10 when necessary, and transports the paper to the post-processing apparatus 30.

The post-processing apparatus 20 includes a CPU 21, a ROM 22, a RAM 23, a paper transporter 24, a transport direction cutter 25, a width direction cutter 26, a front-stage I/F 27, a rear-stage I/F 28, and the like.

The CPU 21, the ROM 22, and the RAM 23 are the same as the CPU 11, the ROM 12, and the RAM 13 except that the control target of the CPU 21 is the post-processing apparatus 20.

The paper transporter 24 transports the paper transported from the image forming apparatus 10 to the post-processing apparatus 20.

The transport direction cutter 25 is a post-processor that cuts paper along the transport direction. The transport direction cutter 25 cuts one or both ends of the paper in the width direction (direction perpendicular to the transport direction of the paper).

The width direction cutter 26 is a post-processor that cuts paper along the width direction. The width direction cutter 26 cuts one or both ends of the paper in the transport direction.

Figure 4:
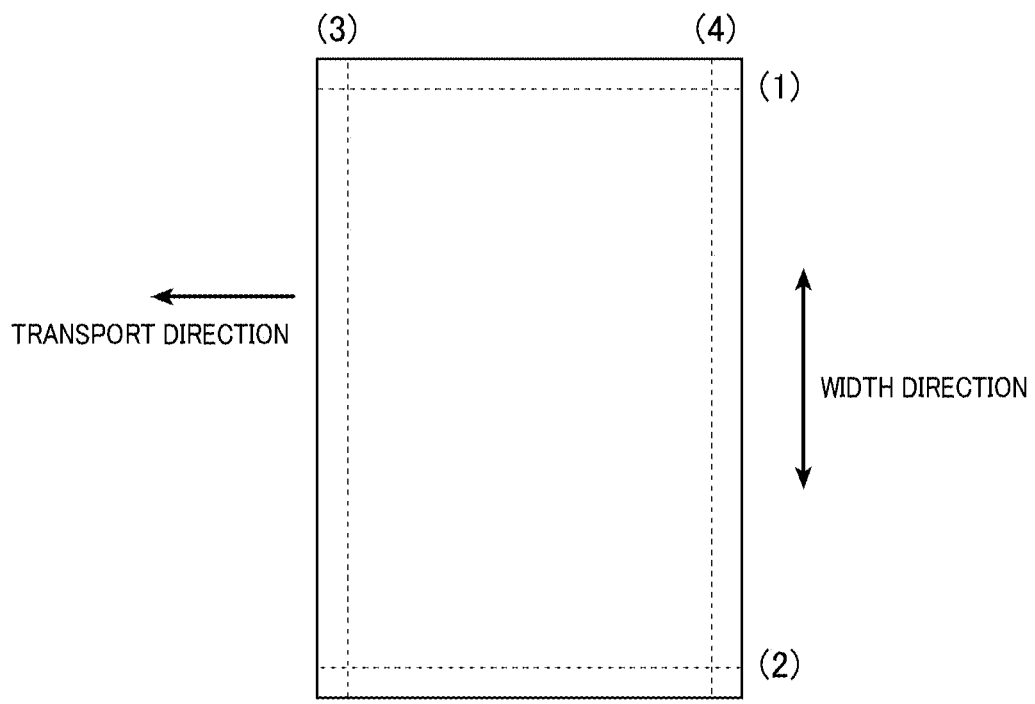
FIG. 4 is an image diagram of paper cut by a post-processing apparatus (cutting machine)

FIG. 4 is an image diagram of paper cut by the post-processing apparatus 20 (cutting machine).

The transport direction cutter 25 cuts the back side (1) and the near side (2) of the paper illustrated in FIG. 4. The transport direction cutter 25 cuts the paper by rotating a roller cutter while transporting the paper.

The width direction cutter 26 cuts a front end (3) and a rear end (4) in the paper transport direction illustrated in FIG. 4. The width direction cutter 26 cuts the paper by temporarily stopping the paper and moving the paper while rotating a roller cutter or the like in the width direction of the paper.

In the post-processing setting corresponding to the cutting processing, a cutting amount for each cutting position (back side/near side/front end/rear end) is included as a set value.

The front-stage I/F 27 transmits and receives data to and from the image forming apparatus 10.

The rear-stage I/F 28 transmits and receives data to and from the post-processing apparatus 30.

The post-processing apparatus 30 is a punching/folding machine that performs punching processing and folding processing on the paper. The post-processing apparatus 30 performs punching processing and folding processing on the paper transported from the post-processing apparatus 20 when necessary, and transports the paper to the post-processing apparatus 40.

The post-processing apparatus 30 includes a CPU 31, a ROM 32, a RAM 33, a paper transporter 34, a puncher 35, a folder 36, an inserter 37, a front-stage I/F 38, a rear-stage I/F 39, and the like.

The CPU 31, the ROM 32, and the RAM 33 are the same as the CPU 11, the ROM 12, and the RAM 13 except that the control target of the CPU 31 is the post-processing apparatus 30.

The paper transporter 34 transports the paper transported from the post-processing apparatus 20 into the post-processing apparatus 30.

The puncher 35 is a post-processor that performs punching processing on the paper. The post-processing setting corresponding to the punching processing includes a punching position and the number of punch holes.

The folder 36 is a post-processor that performs folding processing and Z-folding processing on the paper. The post-processing setting corresponding to the folding processing includes the type of folding.

The inserter 37 inserts colored paper, tab paper, or the like between a plurality of pieces of paper on which images are formed.

The front-stage I/F 38 transmits and receives data to and from the post-processing apparatus 20.

The rear-stage I/F 39 transmits and receives data to and from the post-processing apparatus 40.

The post-processing apparatus 40 is a binding/overlapping folding machine that performs binding processing and overlapping folding processing on paper. The post-processing apparatus 40 performs binding processing and overlapping folding processing on the paper transported from the post-processing apparatus 30 when necessary, and discharges the paper to paper discharge trays T11 to T13.

The post-processing apparatus 40 includes a CPU 41, a ROM 42, a RAM 43, a paper transporter 44, a flat binder 45, a saddle binder 46, a front-stage I/F 47, and the like.

The CPU 41, the ROM 42, and the RAM 43 are the same as the CPU 11, the ROM 12, and the RAM 13 except that the control target of the CPU 41 is the post-processing apparatus 40.

The paper transporter 44 transports the paper transported from the post-processing apparatus 30 into the post-processing apparatus 40.

The flat binder 45 is a post-processor that performs flat binding processing on the paper.

The saddle binder 46 is a post-processor that performs saddle binding processing, overlapping folding processing, and overlapping triple-folding processing on the paper.

The post-processing settings corresponding to the binding processing include the staple position, the number of staples, and the type of binding.

The post-processing setting corresponding to the overlapping folding processing includes the type of overlapping folding.

The front-stage I/F 47 transmits and receives data to and from the post-processing apparatus 30.

The post-processing apparatuses 20, 30, and 40 perform at least two post-processes stepwise on the paper on which an image is formed by the image forming apparatus 10.

The operation display 18 receives post-processing settings corresponding to at least the two post-processes.

The CPU 11 causes the storage 14 to store the post-processing settings received by the operation display 18.

The CPU 11 determines whether or not at least the two post-processes are executable based on the post-processing settings corresponding to at least the two post-processes.

In a case where it is determined that at least the two post-processes are not executable, when the post-processing setting corresponding to one post-processing of at least the two post-processes is a setting including numerical value input, the CPU 11 provides notification regarding a numerical value input setting change in the post-processing setting corresponding to the one post-processing.

For example, as a notification regarding a numerical value input setting change, the CPU 11 prompts the user to change the numerical value of the post-processing setting corresponding to one post-processing.

In a case where it is determined that at least the two post-processes are not executable and the post-processing setting corresponding to one post-processing is a setting including numerical value input, when the absolute value of a difference between a current set value in the post-processing setting corresponding to the one post-processing and a set value at which at least the two post-processes are executable is equal to or less than a predetermined value, the CPU 11 provides notification regarding a numerical value input setting change.

A "set value at which at least two post-processes are executable" or a value for calculating the "set value at which at least two post-processes are executable" is stored in the storage 14 in advance.

The predetermined value is stored in the storage 14 in advance.

As a notification regarding a numerical value input setting change, the CPU 11 notifies the user of the difference between the current set value in the post-processing setting corresponding to one post-processing and the set value at which at least two post-processes are executable.

In a case where one post-processing is both ends cutting processing for cutting both ends of image-formed paper, the post-processing setting corresponding to the both ends cutting processing is a setting including numerical value input.

In a case where it is determined that at least the two post-processes are not executable, the CPU 11 notifies the user of a numerical value input setting change in the post-processing setting corresponding to the both ends cutting processing.

In a case where it is determined that at least the two post-processes are not executable, when the absolute value of a difference between the sum of the current cutting amounts and the sum of the cutting amounts, at which at least the two post-processes are executable, for the sum of the cutting amounts corresponding to both ends, is equal to or less than a predetermined value, the CPU 11 provides notification regarding a numerical value input setting change for the cutting amounts corresponding to both ends.

As a notification regarding a numerical value input setting change, the CPU 11 notifies the user of the difference between the sum of the current cutting amounts and the sum of the cutting amounts, at which at least the two post-processes are executable, for the sum of the cutting amounts corresponding to both ends.

In a case where it is determined that at least the two post-processes are not executable, when the paper size after both ends cutting processing for making at least the two post-processes executable is a standard paper size, the CPU 11 prompts the user to change the numerical value in the post-processing setting corresponding to the both ends cutting processing so that the paper size after the both ends cutting processing becomes a standard paper size.

Next, an operation in the image forming system 100 will be described.

Figure 5:
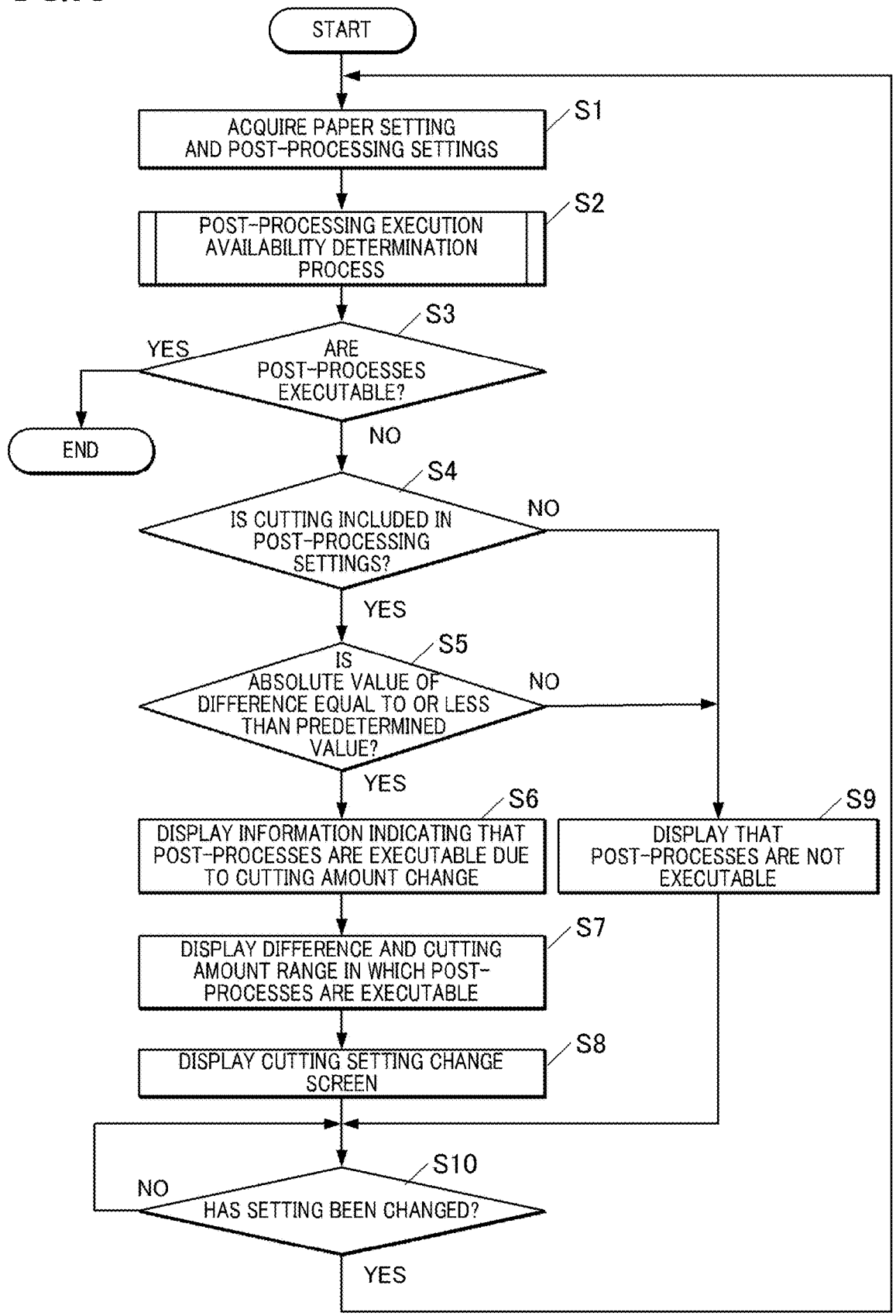
FIG. 5 is a flowchart illustrating a basic process executed by an image forming apparatus.

FIG. 5 is a flowchart illustrating a basic process executed by the CPU 11 of the image forming apparatus 10.

First, the CPU 11 acquires a paper setting and a plurality of post-processing settings from the operation display 18 (step S1).

Then, the CPU 11 executes a post-processing execution availability determination process (step S2). The CPU 11 determines whether or not the plurality of set post-processes are executable from the paper size included in the paper setting and the post-processing settings.

Figure 6:
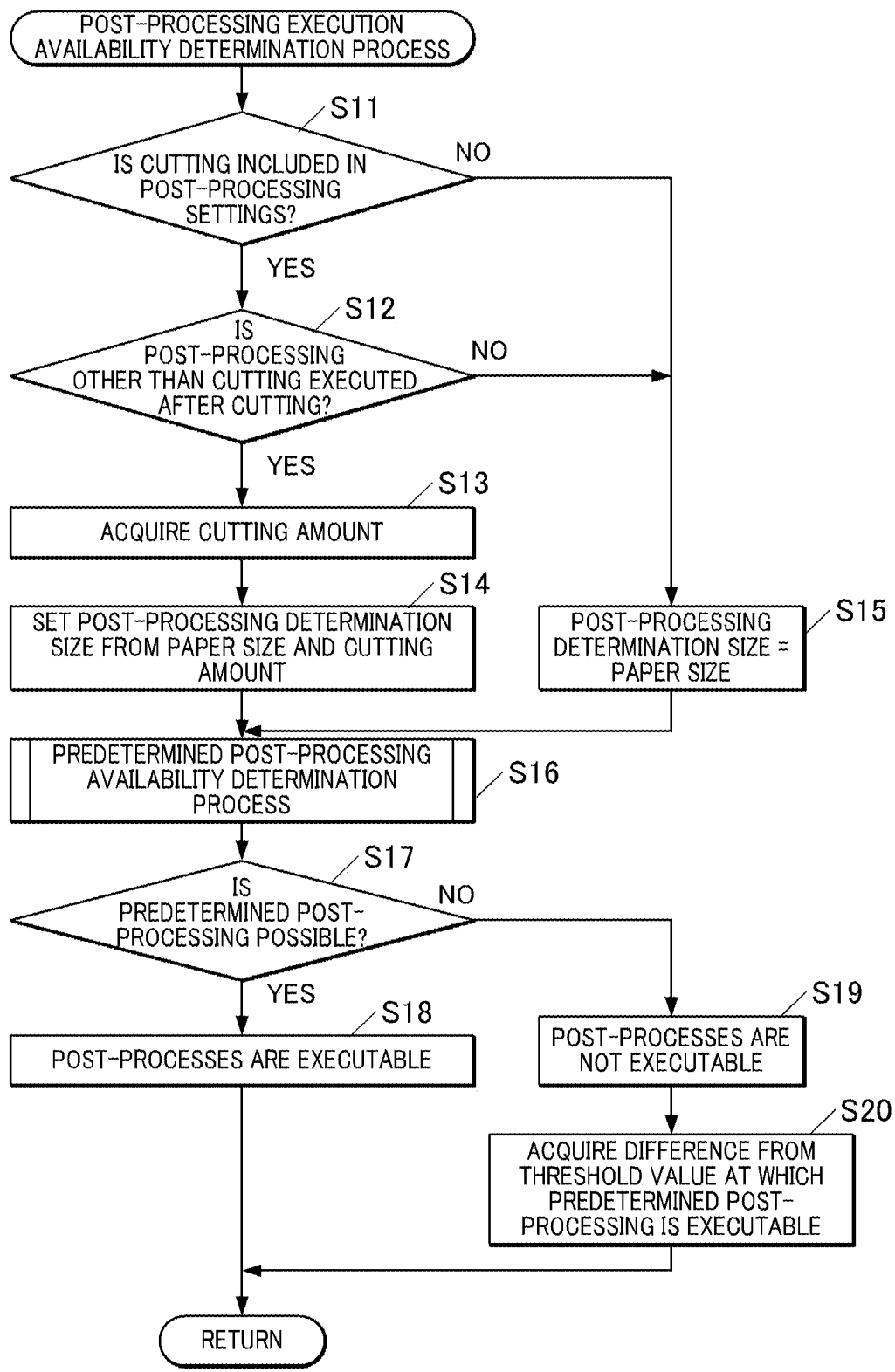
FIG. 6 is a flowchart illustrating a post-processing execution availability determination process.

The post-processing execution availability determination process will be described with reference to FIG. 6.

The CPU 11 determines whether or not cutting is included in the plurality of post-processing settings acquired in step S1 (step S11). Specifically, the CPU 11 determines whether or not a setting relevant to the cutting processing in the transport direction cutter 25 or the width direction cutter 26 is included in the plurality of post-processing settings.

If cutting is included in the plurality of post-processing settings (step S11; YES), the CPU 11 determines whether or not post-processing (hereinafter, referred to as predetermined post-processing) other than the cutting included in the plurality of post-processing settings acquired in step S1 is to be executed after cutting (step S12). Specifically, the CPU 11 determines whether or not the predetermined post-processing is to be executed after cutting based on the information of the post-processor included in each of the post-processing apparatuses 20, 30, and 40, which is stored in the storage 14, and the connection order of the post-processing apparatuses 20, 30, and 40.

If the predetermined post-processing is to be executed after cutting (step S12; YES), the CPU 11 acquires the cutting amount in the cutting processing from the plurality of post-processing settings acquired in step S1 (step S13).

Then, the CPU 11 sets a post-processing determination size (width and length) from the paper size included in the paper setting acquired in step S1 and the cutting amount acquired in step S13 according to the following equations (step S14).

Post-processing determination size width=Paper size width−(Back side cutting amount+Near side cutting amount)

Post-processing determination size length=Paper size length−(Front end cutting amount+Rear end cutting amount).

In FIG. 4, the cutting amount on the back side (1) is the back side cutting amount, the cutting amount on the near side (2) is the near side cutting amount, the cutting amount of the front end (3) is the front end cutting amount, and the cutting amount of the rear end (4) is the rear end cutting amount. Depending on the cutting direction, if there is no setting of the cutting amounts on the back side (1) and the near side (2) or if there is no setting of the cutting amounts of the front end (3) and the rear end (4), the cutting amount is calculated as zero. If the cutting amount on one of the back side (1) and the near side (2) is 0 and if the cutting amount of one of the front end (3) and the rear end (4) is 0, one end of the paper is cut.

If cutting is not included in the plurality of post-processing settings in step S11 (step S11; NO) or if predetermined post-processing is to be executed before cutting in step S12 (step S12; NO), the CPU 11 sets the paper size included in the paper setting acquired in step S1 as the post-processing determination size as it is (step S15).

After step S14 or step S15, the CPU 11 executes a predetermined post-processing availability determination process (step S16). The CPU 11 determines whether or not the predetermined post-processing is executable based on the post-processing setting of the predetermined post-processing included in the plurality of post-processing settings acquired in step S1 and the post-processing determination size set in step S14 or step S15.

Figure 7:
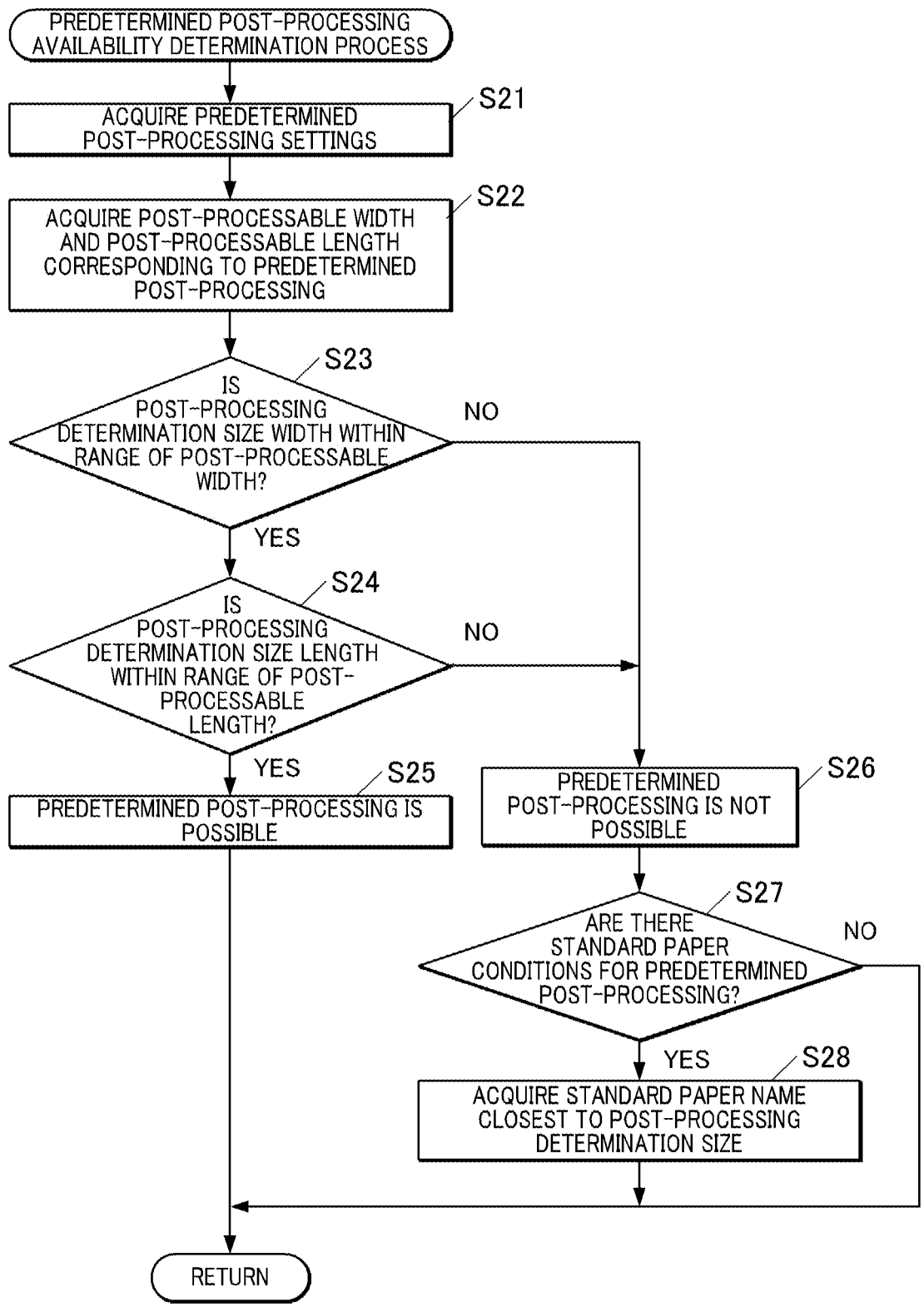
FIG. 7 is a flowchart illustrating a predetermined post-processing availability determination process.

In the predetermined post-processing availability determination process, as illustrated in FIG. 7, the CPU 11 acquires the post-processing setting of the predetermined post-processing from the plurality of post-processing settings acquired in step S1 (step S21).

Then, the CPU 11 acquires a post-processable width and a post-processable length corresponding to the predetermined post-processing from the post-processing determination table 141 stored in the storage 14 (step S22).

Then, the CPU 11 determines whether or not the post-processing determination size width is within the range of the post-processable width corresponding to the predetermined post-processing (step S23).

If the post-processing determination size width is within the range of the post-processable width corresponding to the predetermined post-processing (step S23; YES), the CPU 11 determines whether or not the post-processing determination size length is within the range of the post-processable length corresponding to the predetermined post-processing (step S24).

If the post-processing determination size length is within the range of the post-processable length corresponding to the predetermined post-processing (step S24; YES), the CPU 11 determines that the predetermined post-processing is executable (step S25).

If the post-processing determination size width is not within the range of the post-processable width corresponding to the predetermined post-processing in step S23 (step S23; NO) or if the post-processing determination size length is not within the range of the post-processable length corresponding to the predetermined post-processing in step S24 (step S24; NO), the CPU 11 determines that the predetermined post-process is not possible (step S26).

Then, the CPU 11 determines whether or not there are standard paper conditions for the predetermined post-processing (step S27). Specifically, the CPU 11 determines whether or not there are standard paper conditions for the predetermined post-processing, that is, whether or not the predetermined post-processing is post-processing allowed only for the standard paper, with reference to the post-processing determination table 141 stored in the storage 14 (step S28).

If there are standard paper conditions for the predetermined post-processing (step S27; YES), the CPU 11 determines the name of standard paper, which is associated with the post-processable width and the post-processable length closest to the post-processing determination size (width and length) for the predetermined post-processing, with reference to the post-processing determination table 141. The CPU 11 causes the storage 14 to store the name of the standard paper.

If there are no standard paper conditions for the predetermined post-processing in step S27 (step S27; NO), the predetermined post-processing availability determination process ends after step S25 or step S28.

Referring back to FIG. 6, the CPU 11 determines whether or not the predetermined post-processing is executable (step S17).

If the predetermined post-processing is executable (step S17; YES), the CPU 11 determines that the plurality of set post-processes are executable (step S18).

If the predetermined post-processing is not possible in step S17 (step S17; NO), the CPU 11 determines that the plurality of set post-processes are not executable (step S19).

Then, the CPU 11 acquires a difference between the current cutting amount and the threshold value of the cutting amount at which predetermined post-processing is executable (eventually, a cutting amount at which a plurality of set post-processes are executable) (step S20).

For the threshold value of the cutting amount at which the predetermined post-processing is executable, the post-processable width and the post-processable length corresponding to the predetermined post-processing are acquired from the post-processing determination table 141 stored in the storage 14, and a boundary value of the cutting amount at which the predetermined post-processing is executable is calculated from the relationship between the post-processable width and the post-processable length and the paper size.

After step S18 or step S20, the post-processing execution availability determination process ends.

Referring back to FIG. 5, as a result of the post-processing execution availability determination process (step S2), the CPU 11 determines whether or not the plurality of set post-processes are executable (step S3).

If the plurality of set post-processes are not executable (step S3; NO), the CPU 11 determines whether or not cutting is included in the plurality of post-processing settings acquired in step S1 (step S4).

If cutting is included in the plurality of post-processing settings (step S4; YES), the CPU 11 determines whether or not the absolute value of a difference between the current cutting amount and the threshold value of the cutting amount at which the predetermined post-processing is executable is equal to or less than a predetermined value (step S5). As the difference, the value acquired in step S20 is used. As the predetermined value, a value set in advance is used. As the predetermined value, a different value may be used for each post-processing (post-processing whose execution as predetermined post-processing is determined).

If the absolute value of the difference is equal to or less than the predetermined value (step S5; YES), the CPU 11 causes the operation display 18 to display information indicating that the post-processes are executable due to the change in the cutting amount (step S6). For example, the CPU 11 notifies the user that the prohibition between the plurality of post-processes is released by changing the setting of the cutting amount (refer to FIGS. 12, 14, and 16).

Figure 13:
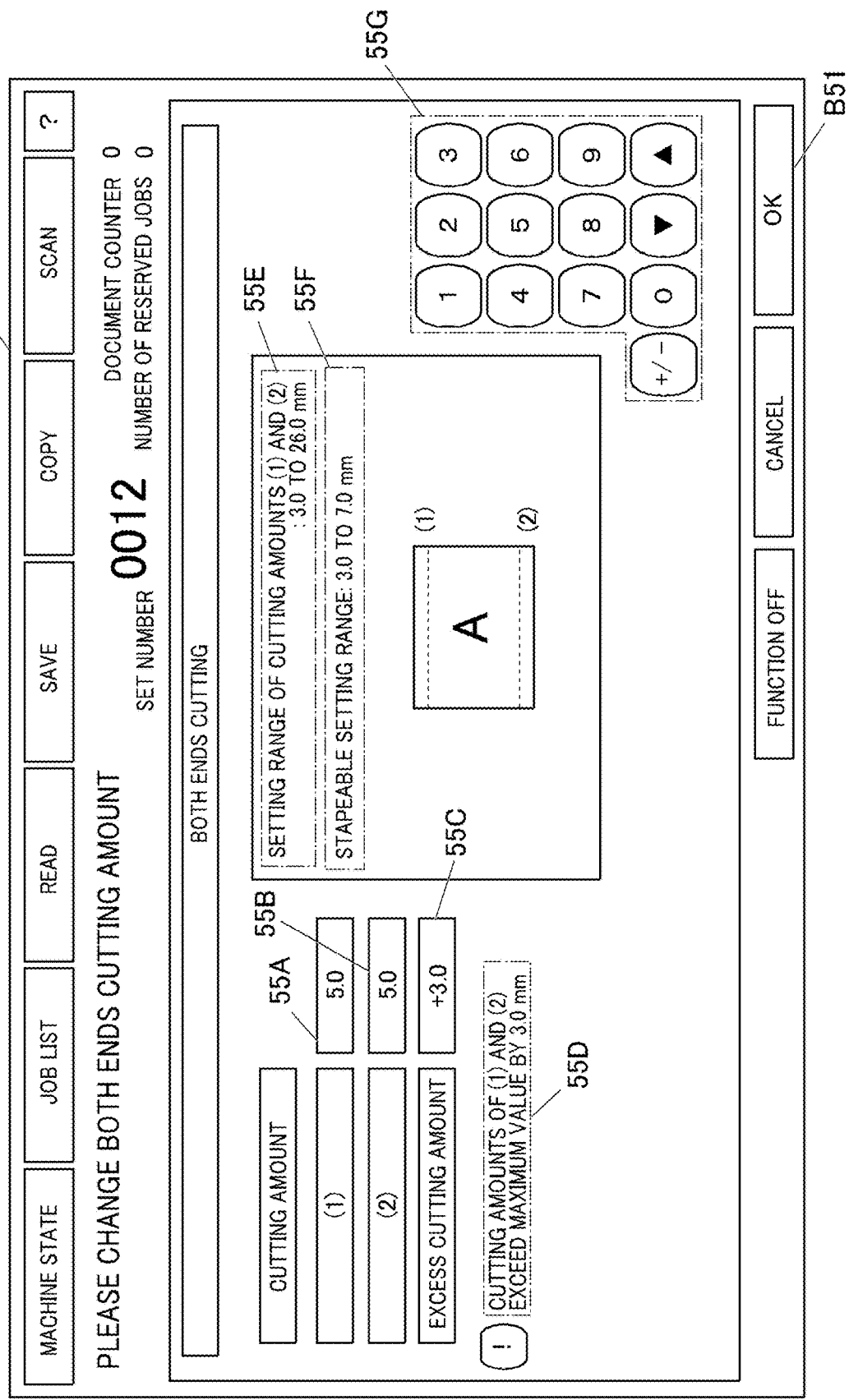
FIG. 13 is an example of a both ends cutting setting change screen.
Figure 14:
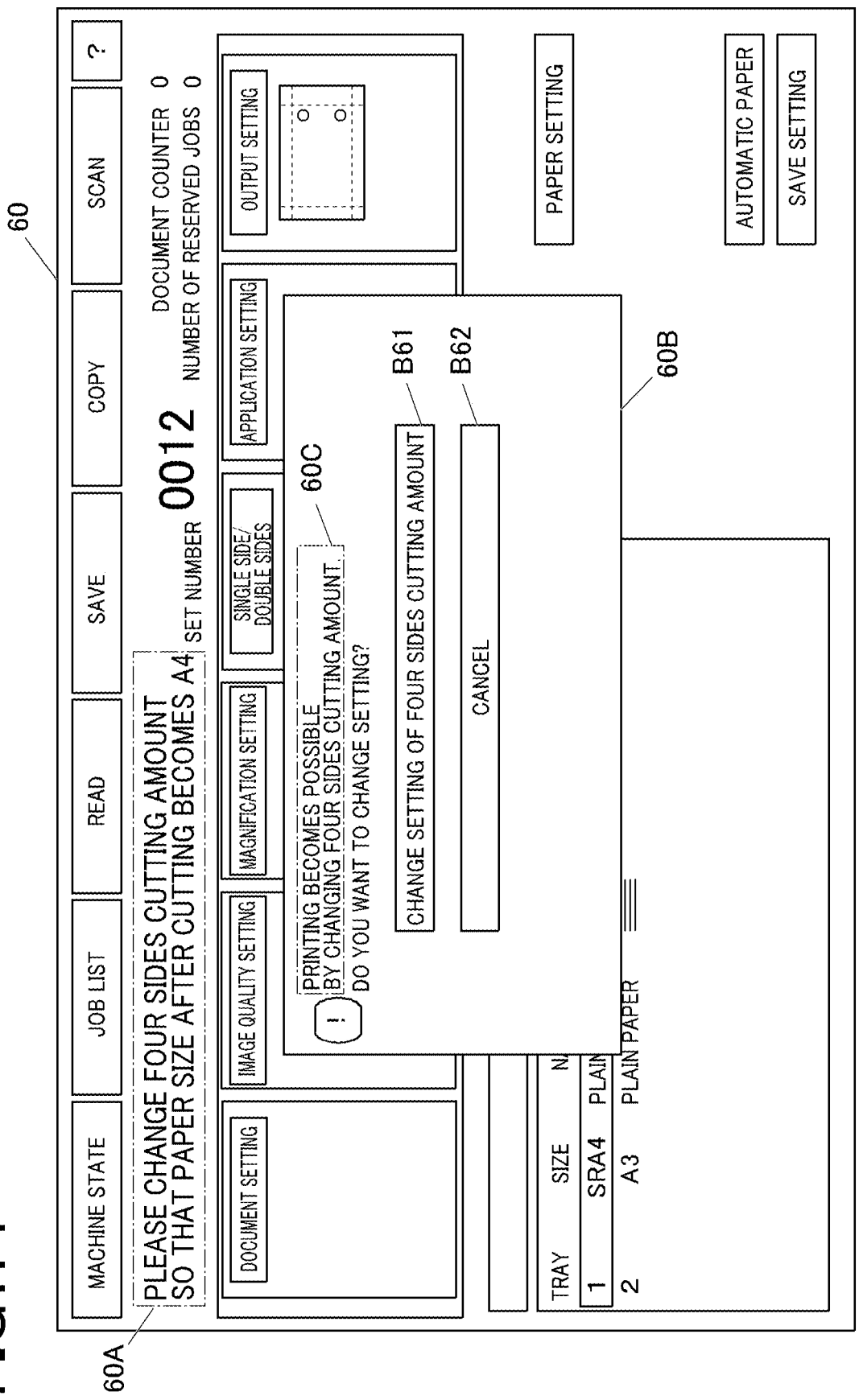
FIG. 14 is an example of a notification screen in post-processing setting example 2.
Figure 15:
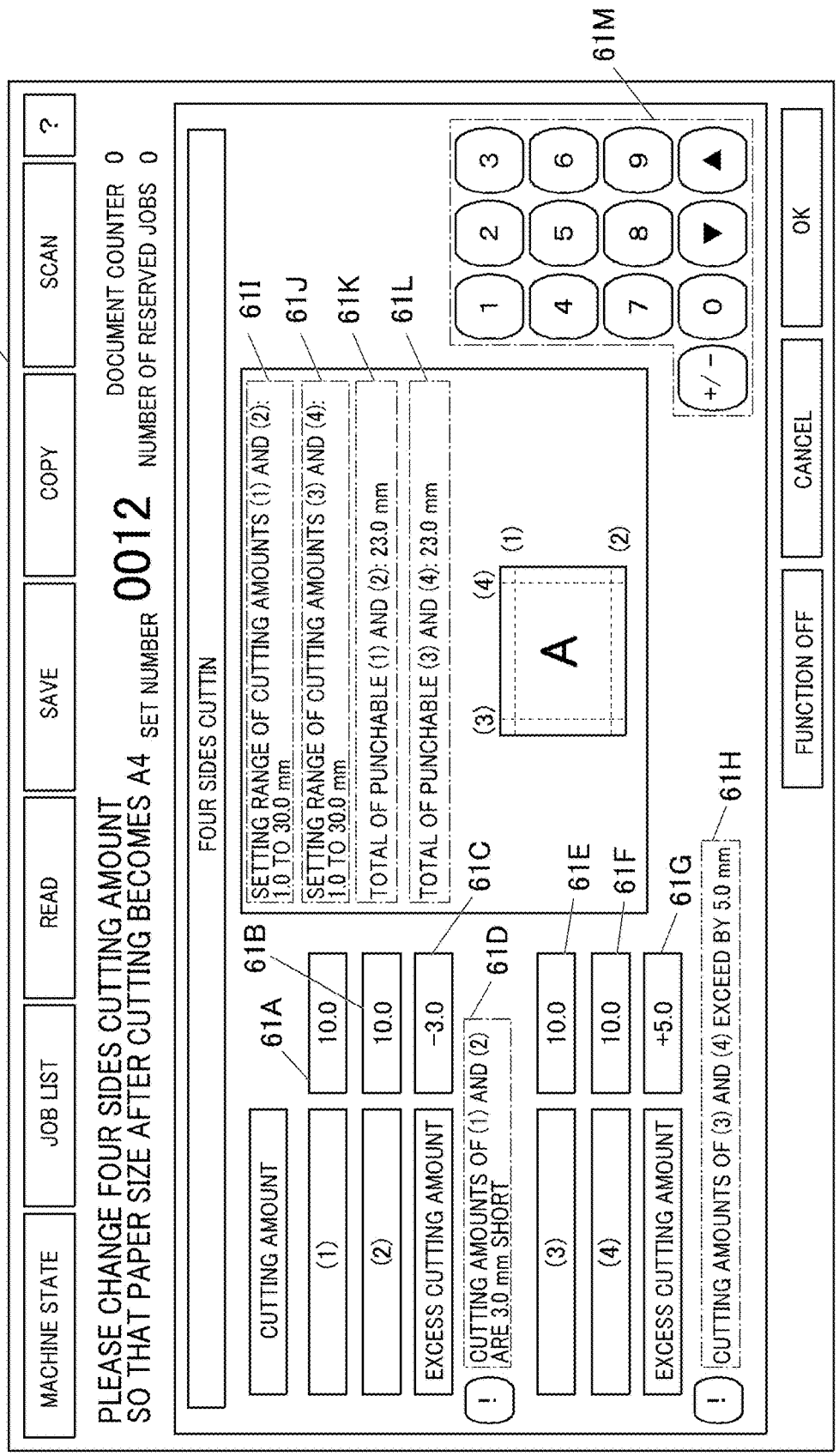
FIG. 15 is an example of a four sides cutting setting change screen.
Figure 17:
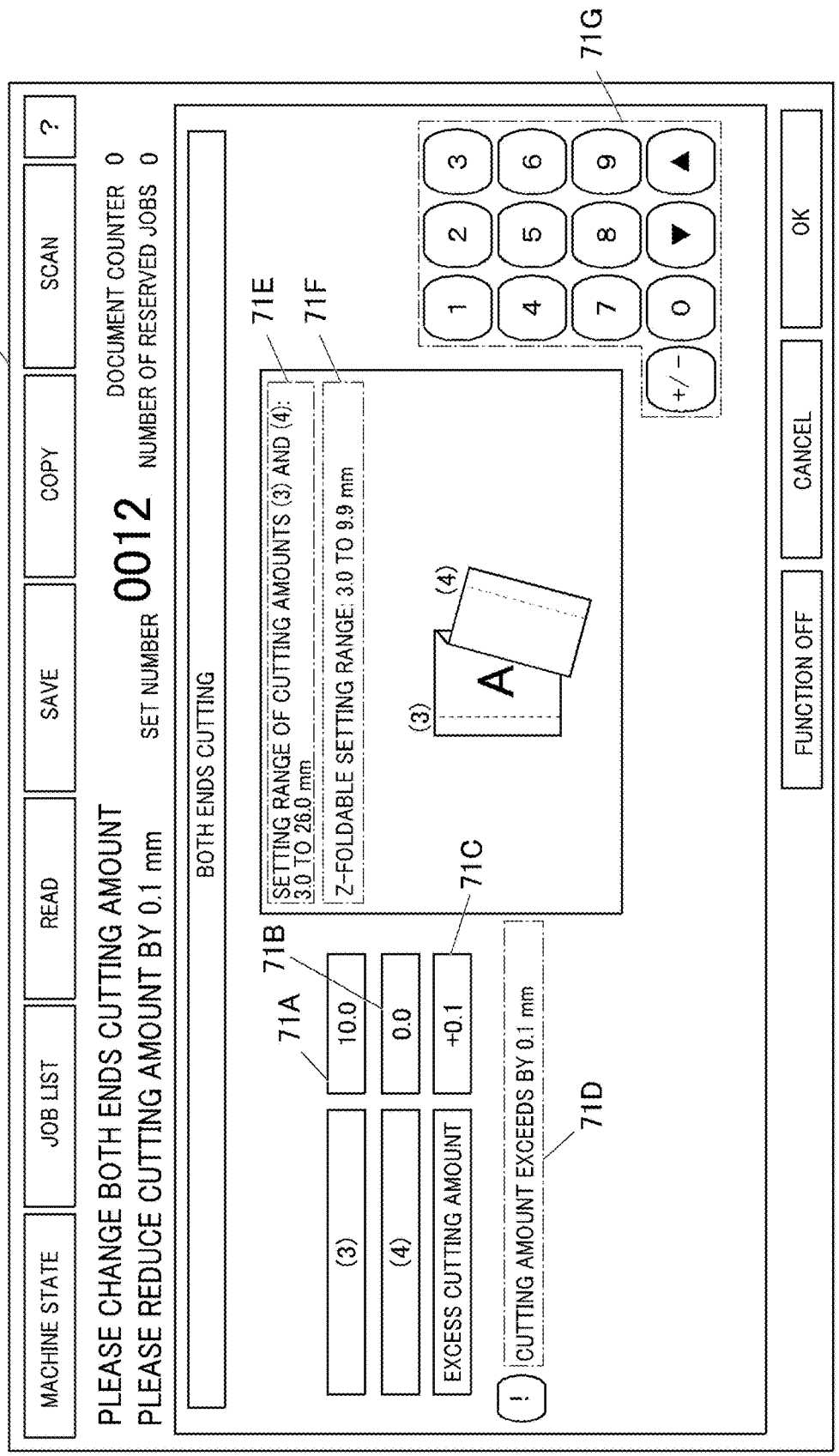
FIG. 17 is an example of a both ends cutting setting change screen.

The CPU 11 causes the operation display 18 to display the range of the cutting amount at which the post-processes are executable and the difference between the current cutting amount and the cutting amount at which the post-processes are executable (step S7) (refer to FIGS. 13, 15, and 17). If there are standard paper conditions for the predetermined post-processing, the CPU 11 may also display the name of the standard paper acquired in step S28 (refer to FIGS. 14 and 15).

The CPU 11 causes the operation display 18 to display a cutting setting change screen for changing the setting of the cutting amount (step S8) (refer to FIGS. 13, 15, and 17).

If cutting is not included in the plurality of post-processing settings in step S4 (step S4; NO) or if the absolute value of the difference is greater than the predetermined value in step S5 (step S5; NO), the CPU 11 causes the operation display 18 to display that the post-processes are not executable (step S9). Since the post-processes are not executable, the CPU 11 displays a notification for prompting the user to change the paper setting or to cancel the post-processing setting.

After step S8 or step S9, the CPU 11 determines whether or not the setting of the cutting amount has been changed by the user's operation on the operation display 18 (step S10). If the setting of the cutting amount has not been changed (step S10; NO), the process returns to step S10.

If the setting of the cutting amount has been changed in step S10 (step S10; YES), the process returns to step S1 to repeat the same processing.

If it is determined that the plurality of post-processes are executable in step S3 (step S3; YES), the basic process ends, and a printable state is set.

Post-Processing Setting Example 1

As post-processing setting example 1, a case of setting both ends cutting processing (cutting along the transport direction) and stapling processing will be described.

First, on the operation display 18 of the image forming apparatus 10, the user performs a post-processing setting corresponding to paper setting and a plurality of post-processes.

Figure 8:
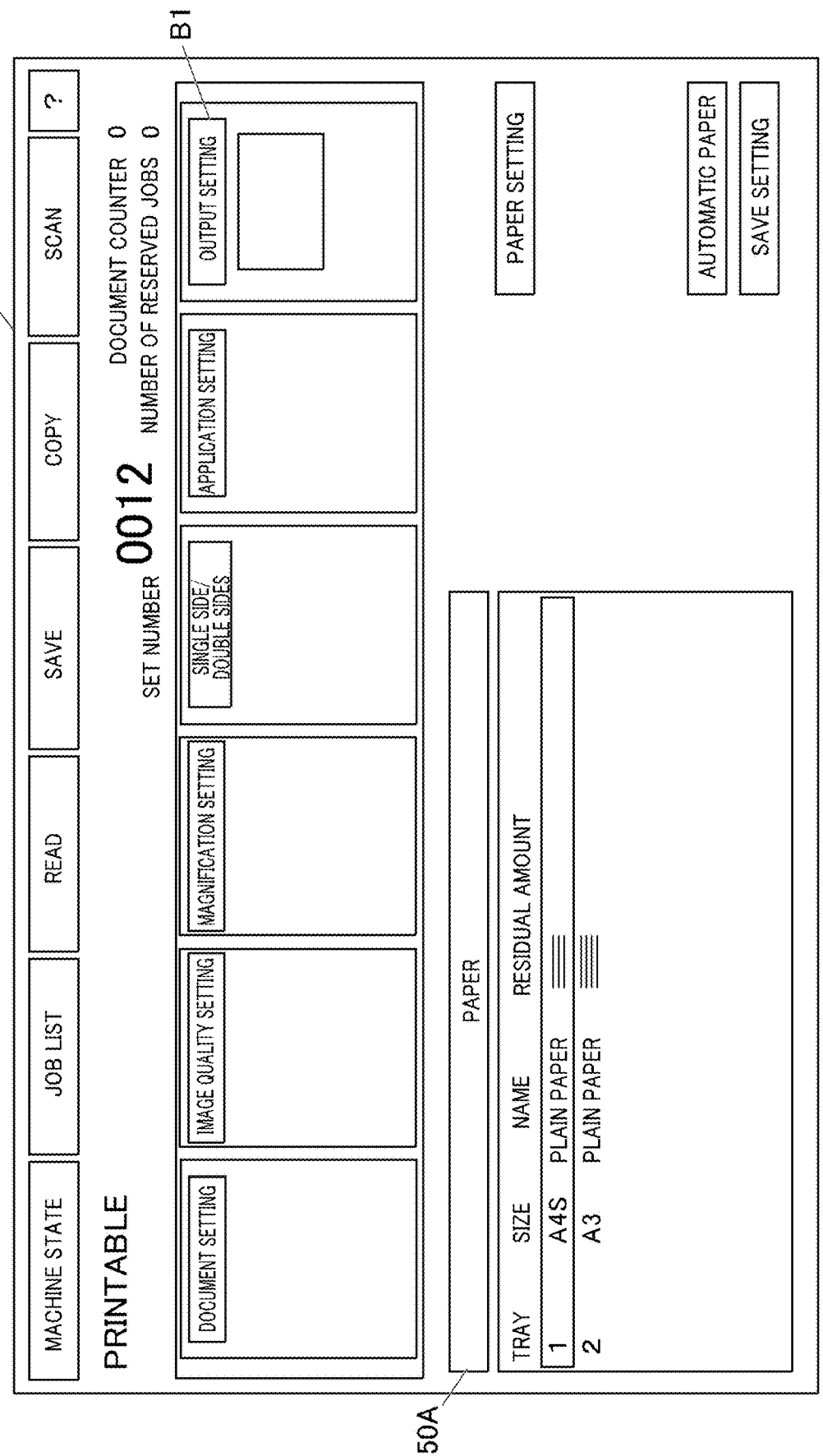
FIG. 8 is an example of a setting screen in post-processing setting example 1.

FIG. 8 is an example of a setting screen 50 displayed on the operation display 18. In a paper selection area 50A of the setting screen 50, for each paper feed tray, the paper setting of paper stored in the paper feed tray is displayed. The paper setting includes the size (including the direction), the name, and the like of paper. The correspondence between the paper feed tray and the paper setting is stored in the storage 14 in advance. For each paper feed tray, the remaining amount of paper is displayed in the paper selection area 50A.

The user operates the operation display 18 to select one of the papers (paper feed trays). For example, the user selects "Tray 1/A4S size/plain paper".

Figure 9:
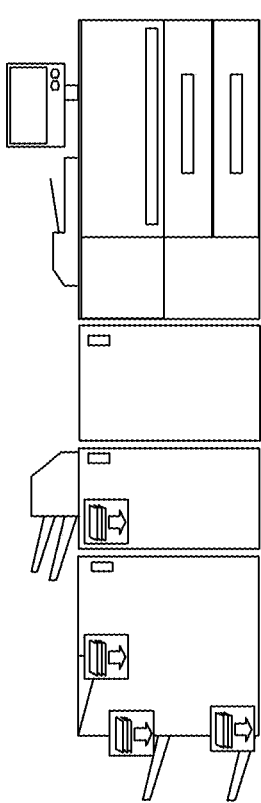
FIG. 9 is an example of an output setting screen.

Then, when the user operates the operation display 18 to press an output setting button B1 on the setting screen 50, an output setting screen 51 illustrated in FIG. 9 is displayed.

Figure 10:
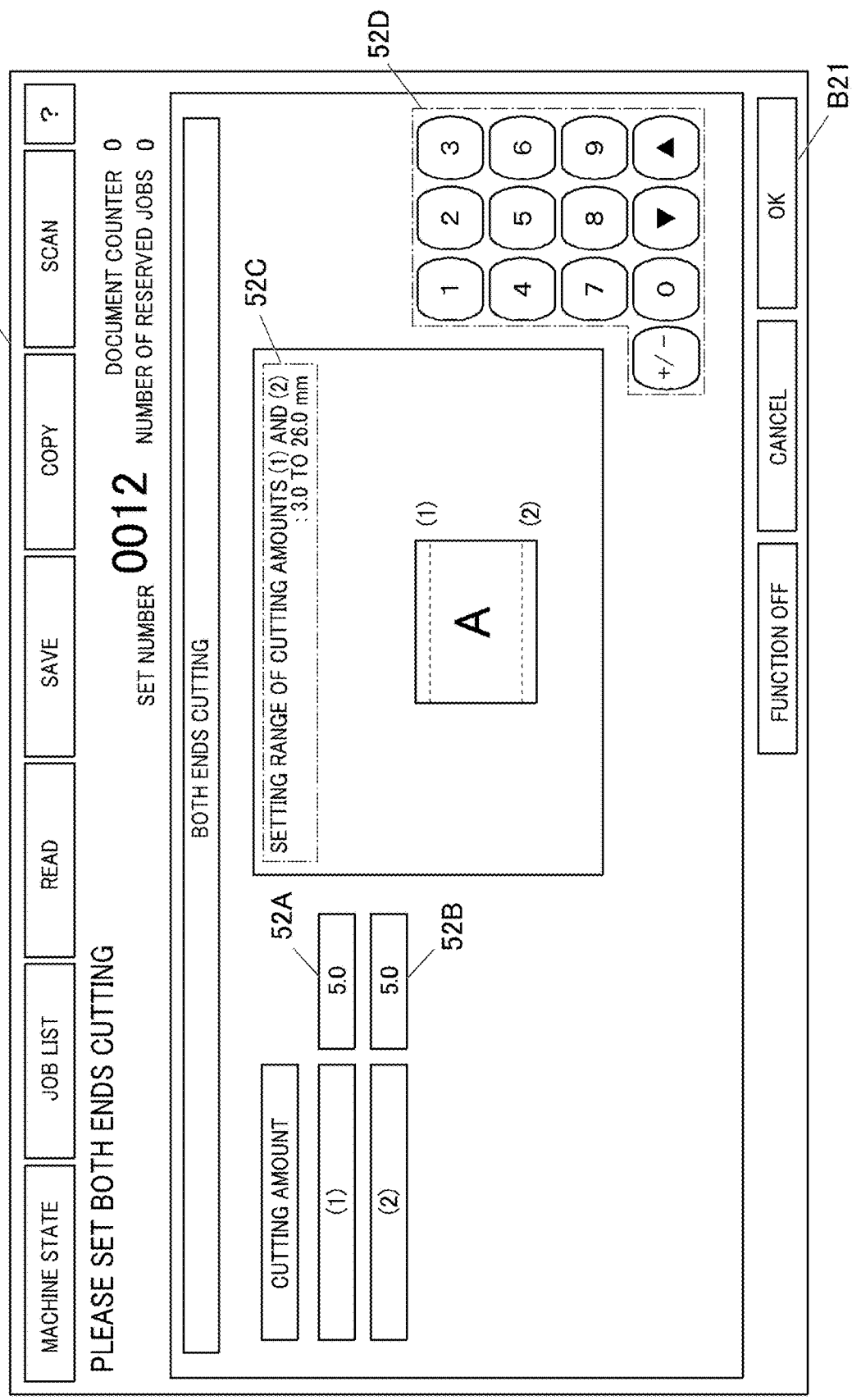
FIG. 10 is an example of a both ends cutting setting screen.

When the user operates the operation display 18 to press a both ends cutting button B11 in a post-processing selection area 51A on the output setting screen 51, a both ends cutting setting screen 52 illustrated in FIG. 10 is displayed. The both ends cutting setting screen 52 is a screen for setting the back side cutting amount and the near side cutting amount in the cutting processing of the transport direction cutter 25.

The both ends cutting setting screen 52 includes a back side cutting amount setting area 52A, a near side cutting amount setting area 52B, a setting range 52C of the cutting amounts (1) and (2), a numerical value inputter 52D, and the like.

The back side cutting amount setting area 52A is an area for setting the back side cutting amount. When the user designates the back side cutting amount setting area 52A and inputs a numerical value through the numerical value inputter 52D, the input value is displayed in the back side cutting amount setting area 52A. In FIG. 10, it is set that the back side of the paper is cut by 5.0 mm.

The near side cutting amount setting area 52B is an area for setting the near side cutting amount. When the user designates the near side cutting amount setting area 52B and inputs a numerical value through the numerical value inputter 52D, the input value is displayed in the near side cutting amount setting area 52B. In FIG. 10, it is set that the near side of the paper is cut by 5.0 mm.

In the setting range 52C of the cutting amounts (1) and (2), a setting range of the sum of the back side cutting amount and the near side cutting amount is displayed.

The numerical value inputter 52D is used when the user inputs a numerical value.

When the user operates the operation display 18 to press an OK button B21 on the both ends cutting setting screen 52 after inputting the cutting amount, the screen returns to the output setting screen 51 illustrated in FIG. 9. When the user operates the operation display 18 to press a staple button B12 in the post-processing selection area 51A, a staple setting screen 53 illustrated in FIG. 11 is displayed. The staple setting screen 53 is a screen for setting the number of staples, staple positions, and a staple interval in the stapling processing of the flat binder 45.

The staple setting screen 53 includes a corner staple setting area 53A and a two-point staple setting area 53B.

The corner staple setting area 53A is an area for setting the position (left corner/right corner) of the corner staple.

The two-point staple setting area 53B is an area for setting the position (left/upper/right) of the two-point staple and a staple interval (wide/slightly narrow/narrow).

When the user operates the operation display 18 to set "left corner" in the corner staple setting area 53A on the staple setting screen 53 and press an OK button B31, the CPU 11 acquires the paper setting and the plurality of post-processing settings set in FIGS. 8 to 11, and determines whether or not the post-processing is executable based on the paper size included in the paper setting and the post-processing settings for the both ends cutting processing and the stapling processing.

Since the paper size is "A4S size", the paper width is 210.0 mm and the paper length is 297.0 mm.

Since the back side cutting amount and the near side cutting amount set for the both ends cutting processing are 5.0 mm, the paper width and the paper length after cutting are 200.0 mm and 297.0 mm, respectively.

The stapleable paper width is 203.0 mm to 331.0 mm (refer to FIG. 3).

Even though the minimum stapleable paper width is 203.0 mm, the paper width after cutting is 200.0 mm. Therefore, it is determined that the post-processing is not executable.

Since the original paper width is 210.0 mm and the minimum stapleable paper width is 203.0 mm, the maximum value of the sum of the back side cutting amount and the near side cutting amount at which the stapling processing is executable is 7.0 mm.

Even though the sum of the current back side cutting amount and the current near side cutting amount is 10.0 mm, the sum (maximum value) of the back side cutting amount and the near side cutting amount at which the stapling processing is executable is 7.0 mm. Therefore, the difference between the sum of the current cutting amounts and the sum of the cutting amounts at which the stapling processing is executable is "3.0 mm".

Figure 12:
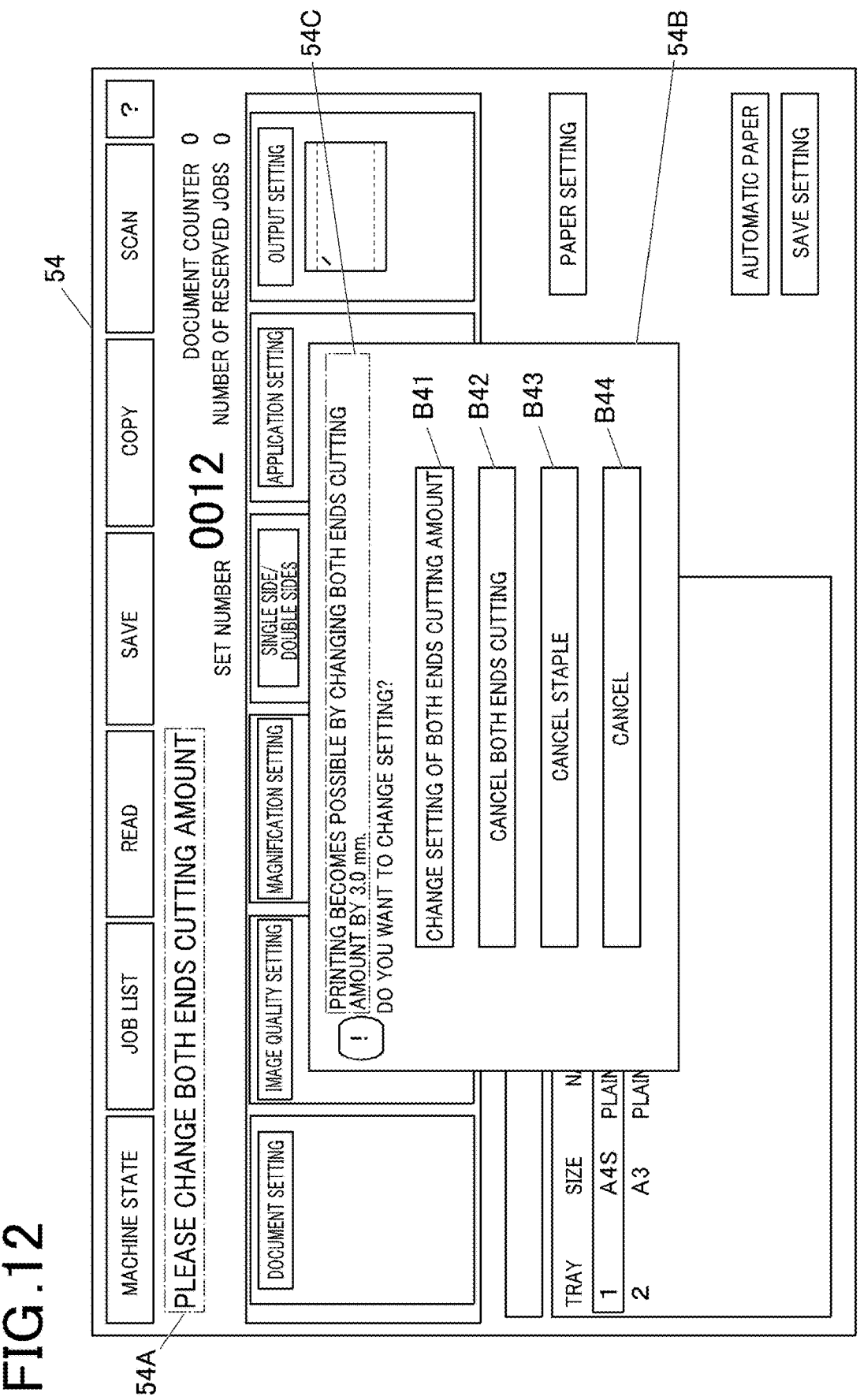
FIG. 12 is an example of a notification screen.

Based on these determination results, a notification screen 54 illustrated in FIG. 12 is displayed. The notification screen 54 is for notifying that printing is not executable due to the setting of the both ends cutting processing and the stapling processing. The notification screen 54 includes instruction information 54A for prompting the user to change the setting of the both ends cutting amount and a confirmation screen 54B.

The confirmation screen 54B includes notification information 54C indicating that "printing becomes possible by changing the both ends cutting amount by approximately 3.0 mm", a setting change button B41 for the both ends cutting amount, a both ends cutting cancel button B42, a staple cancel button B43, and a cancel button B44.

The notification information 54C includes a required change amount (absolute value of the difference=3.0 mm) for the both ends cutting amount.

When the user operates the operation display 18 to press the setting change button B41 for the both ends cutting amount on the confirmation screen 54B, a both ends cutting setting change screen 55 illustrated in FIG. 13 is displayed.

The both ends cutting setting change screen 55 includes a back side cutting amount setting area 55A, a near side cutting amount setting area 55B, an excess cutting amount display area 55C, notification information 55D, a setting range 55E of the cutting amounts (1) and (2), a stapleable setting range 55F, a numerical value inputter 55G, and the like.

The current back side cutting amount is displayed in the back side cutting amount setting area 55A.

The current near side cutting amount is displayed in the near side cutting amount setting area 55B.

A value (difference=3.0 mm) obtained by subtracting the maximum value (7.0 mm) of the sum of the back side cutting amount and the near side cutting amount, at which the stapling processing is executable, from the sum (10.0 mm) of the current back side cutting amount and the current near side cutting amount is displayed in the excess cutting amount display area 55C. A case where the excess cutting amount is a positive value indicates that the set cutting amount is too large, and a case where the excess cutting amount is a negative value indicates that there is room to increase the cutting amount.

The notification information 55D includes the fact that the sum of the current back side cutting amount and the current near side cutting amount exceeds the maximum stapleable cutting amount by 3.0 mm.

The setting range 55E of the cutting amounts (1) and (2) and the numerical value inputter 55G are the same as the setting range 52C of the cutting amounts (1) and (2) and the numerical value inputter 52D in FIG. 10.

In the stapleable setting range 55F, a setting range "3.0 to 7.0 mm" of the sum of the back side cutting amount and the near side cutting amount at which the stapling processing is executable is displayed. For the cutting processing, a cuttable range is limited by a combination with the stapling processing.

From the notification screen 54 and the both ends cutting setting change screen 55, the user can know that both the stapling processing and the printing processing become possible by changing the both ends cutting amount and know the range of the sum of the back side cutting amount and the near side cutting amount at which the stapling processing is executable and the difference between the sum of the current cutting amounts and the threshold value of the sum of the cutting amounts at which the stapling processing is executable.

The user operates the operation display 18 to reduce the back side cutting amount or the near side cutting amount so that the sum of the back side cutting amount and the near side cutting amount is equal to or less than 7.0 mm. Specifically, the sum of the back side cutting amount and the near side cutting amount may be reduced by 3.0 mm or more from the current state.

Pressing the OK button B51 after appropriately changing the back side cutting amount or the near side cutting amount on the both ends cutting setting change screen 55 by the user corresponds to a cutting amount setting change (step S10; YES) in the basic process (refer to FIG. 5).

Post-Processing Setting Example 2

As post-processing setting example 2, a case of setting four sides cutting processing (cutting along the transport direction+cutting along the width direction) and punching processing will be described.

First, on the operation display 18 of the image forming apparatus 10, the user performs a post-processing setting corresponding to paper setting and a plurality of post-processes.

The user operates the operation display 18 to select "Tray 1/SRA4 size/plain paper" as the paper setting.

The user operates the operation display 18 to select "four sides cutting" as one of the post-processes. Subsequently, the user operates the operation display 18 to set the back side cutting amount to 10.0 mm, the near side cutting amount to 10.0 mm, the front end cutting amount to 10.0 mm, and the rear end cutting amount to 10.0 mm on the four sides cutting setting screen. The four sides cutting setting screen is a screen for setting the back side cutting amount and the near side cutting amount in the cutting processing of the transport direction cutter 25 and the front end cutting amount and the rear end cutting amount in the cutting process of the width direction cutter 26.

The user operates the operation display 18 to select "punch" as one of the post-processes. Subsequently, the user operates the operation display 18 to set "punch two holes/right position" on the punch setting screen. The punch setting screen is a screen for setting the number of punch holes and the punching position in the punching processing of the puncher 35.

The CPU 11 determines whether or not the post-processing is executable based on the paper size included in the paper setting and the post-processing settings for the four sides cutting processing and the punching processing.

Since the paper size is "SRA4 size", the paper width is 320.0 mm and the paper length is 225.0 mm.

Since each of the back side cutting amount, the near side cutting amount, the front end cutting amount, and the rear end cutting amount set for the four sides cutting processing is 10.0 mm, the paper width and the paper length after cutting are 300.0 mm and 205.0 mm, respectively.

The punchable paper size is standard paper, and the standard paper closest to the paper size after cutting is A4L (paper width 297.0 mm, paper length 210.0 mm) (refer to FIG. 3).

Since the paper size after cutting does not match the punchable paper size, it is determined that the post-processing is not executable.

The original paper width is 320.0 mm, and the punchable A4L paper width is 297.0 mm. Therefore, the sum of the back side cutting amount and the near side cutting amount at which the punching processing is executable is 23.0 mm. The original paper length is 225.0 mm, and the punchable A4L paper length is 210.0 mm. Therefore, the sum of the front end cutting amount and the rear end cutting amount at which the punching processing is executable is 15.0 mm.

A notification screen 60 illustrated in FIG. 14 is displayed based on these determination results. The notification screen 60 is for notifying that printing is not executable due to the setting of the four sides cutting processing and the punching processing. The notification screen 60 includes instruction information 60A, which is for prompting the user to change the setting of the four sides cutting amount so that the paper size after cutting becomes A4, and a confirmation screen 60B.

The confirmation screen 60B includes notification information 60C indicating that "printing becomes possible by changing the four sides cutting amount", a four sides cutting amount setting change button B61, and a cancel button B62.

When the user operates the operation display 18 to press the four sides cutting amount setting change button B61 on the confirmation screen 60B, a four sides cutting setting change screen 61 illustrated in FIG. 15 is displayed.

The four sides cutting setting change screen 61 includes a back side cutting amount setting area 61A, a near side cutting amount setting area 61B, an excess cutting amount display area 61C, notification information 61D, a front end cutting amount setting area 61E, and a rear end cutting amount setting area 61F, an excess cutting amount display area 61G, notification information 61H, a setting range 61I of the cutting amounts (1) and (2), a setting range 61J of the cutting amounts (3) and (4), a total 61K of punchable (1) and (2), a total 61L of punchable (3) and (4), a numerical value inputter 61M, and the like.

The current back side cutting amount is displayed in the back side cutting amount setting area 61A.

The current near side cutting amount is displayed in the near side cutting amount setting area 61B.

In the excess cutting amount display area 61C, a value (difference=−3.0 mm) obtained by subtracting the sum (23.0 mm) of the back side cutting amount and the near side cutting amount, at which the punching processing is executable, from the sum (20.0 mm) of the current back side cutting amount and the current near side cutting amount is displayed. A case where the excess cutting amount is a positive value indicates that the set cutting amount is too large, and a case where the excess cutting amount is a negative value indicates that the cutting amount is too small.

The notification information 61D includes the fact that the sum of the current back side cutting amount and the current near side cutting amount is 3.0 mm short of the punchable cutting amount.

The current front end cutting amount is displayed in the front end cutting amount setting area 61E.

The current rear end cutting amount is displayed in the rear end cutting amount setting area 61F.

In the excess cutting amount display area 61G, a value (difference=5.0 mm) obtained by subtracting the sum (15.0 mm) of the front end cutting amount and the rear end cutting amount, at which the punching processing is executable, from the sum (20.0 mm) of the current front end cutting amount and the current rear end cutting amount is displayed.

The notification information 61H includes the fact that the sum of the current front end cutting amount and the current rear end cutting amount exceeds the punchable cutting amount by 5.0 mm.

In the setting range 61I of the cutting amounts (1) and (2), a setting range of the sum of the back side cutting amount and the near side cutting amount is displayed.

In the setting range 61J of the cutting amounts (3) and (4), a setting range of the sum of the front end cutting amount and the rear end cutting amount is displayed.

In the total 61K of punchable (1) and (2), the sum "23.0 mm" of the back side cutting amount and the near side cutting amount at which the punching processing is executable is displayed. This value is a value obtained by subtracting the punchable paper width (297.0 mm) from the paper size width (320.0 mm).

In the total 61L of punchable (3) and (4), the sum "15.0 mm" of the front end cutting amount and the rear end cutting amount at which the punching processing is executable is displayed. This value is a value obtained by subtracting the punchable paper length (210.0 mm) from the paper size length (225.0 mm).

The numerical value inputter 61M is used when the user inputs a numerical value.

From the notification screen 60 and the four sides cutting setting change screen 61, the user can know that both the punching processing and the printing processing become possible by changing the four sides cutting amount and know the total of cutting amounts (1) and (2) at which the punching processing is executable, the total of cutting amounts (3) and (4) at which the punching processing is executable, and the difference between the current value and a value at which the punching processing is executable for the cutting amounts (1) and (2) and the cutting amounts (3) and (4).

The user operates the operation display 18 to adjust the back side cutting amount or the near side cutting amount so that the sum of the back side cutting amount and the near side cutting amount becomes 23.0 mm. Specifically, the sum of the back side cutting amount and the near side cutting amount may be increased by 3.0 mm from the current state.

The user operates the operation display 18 to adjust the front end cutting amount or the rear end cutting amount so that the sum of the front end cutting amount and the rear end cutting amount becomes 15.0 mm. Specifically, the sum of the front end cutting amount and the rear end cutting amount may be reduced by 5.0 mm from the current state.

In a case where the conditions for releasing the prohibition include the standard paper size, the name (A4 or the like) of the standard paper size is additionally displayed as in the instruction information 60A illustrated in FIG. 14, so that the user can easily understand the content.

Post-Processing Setting Example 3

As post-processing setting example 3, a case of setting both ends cutting processing (cutting along the width direction) and Z-folding processing will be described.

First, on the operation display 18 of the image forming apparatus 10, the user performs a post-processing setting corresponding to paper setting and a plurality of post-processes.

The user operates the operation display 18 to select "tray 1/custom size/plain paper" as the paper setting. As the custom size, paper of 210.0 mm (paper width)×288.9 mm (paper length) is set.

The user operates the operation display 18 to select "both ends cutting" as one of the post-processes. Subsequently, the user operates the operation display 18 to set the front end cutting amount to 10.0 mm and the rear end cutting amount to 0.0 mm on the both ends cutting setting screen. The both ends cutting setting screen is a screen for setting the front end cutting amount and the rear end cutting amount in the cutting process of the width direction cutter 26.

The user operates the operation display 18 to select "Z-folding" as one of the post-processes.

The CPU 11 determines whether or not the post-processing is executable based on the paper size included in the paper setting and the post-processing settings for the both ends cutting processing and the Z-folding processing.

The set paper width of the custom size paper is 210.0 mm, and the set paper length is 288.9 mm.

Since the front end cutting amount and the rear end cutting amount set for the both ends cutting processing are 10.0 mm and 0.0 mm, respectively, the paper width and the paper length after cutting are 210.0 mm and 278.9 mm, respectively.

The Z-foldable paper length is 279.0 mm to 458.0 mm (refer to FIG. 3).

Even though the minimum Z-foldable paper length is 279.0 mm, the paper length after cutting is 278.9 mm. Therefore, it is determined that the post-processing is not executable.

The original paper length is 288.9 mm, and the minimum Z-foldable paper length is 279.0 mm. Therefore, the maximum value of the sum of the front end cutting amount and the rear end cutting amount at which the Z-folding processing is executable is 9.9 mm.

Even though the sum of the current front end cutting amount and the current rear end cutting amount is 10.0 mm, the sum (maximum value) of the front end cutting amount and the rear end cutting amount at which the Z-folding processing is executable is 9.9 mm. Therefore, the difference between the sum of the current cutting amounts and the sum of the cutting amounts at which the Z-folding processing is executable is "0.1 mm".

Figure 16:
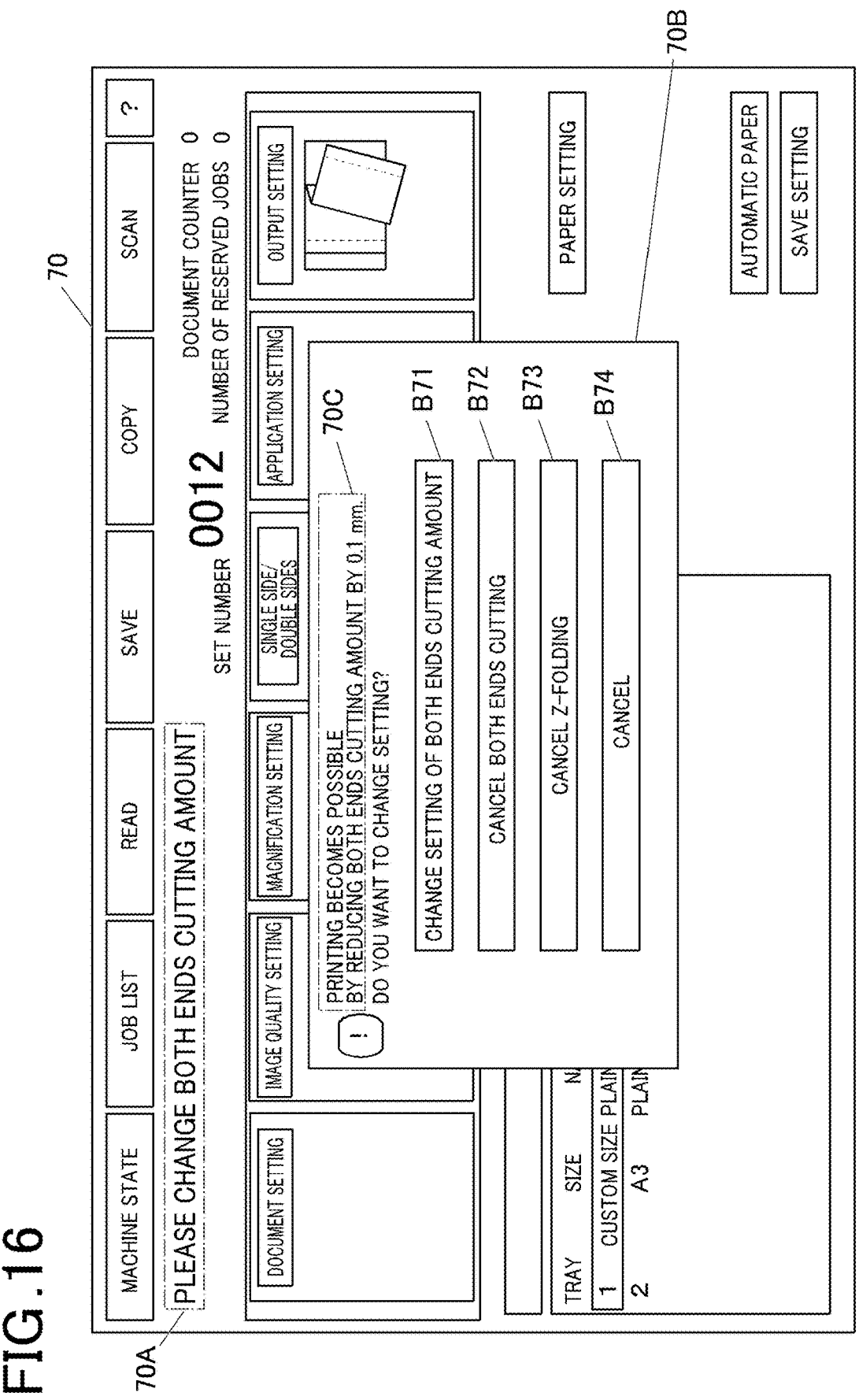
FIG. 16 is an example of a notification screen in post-processing setting example 3.

A notification screen 70 illustrated in FIG. 16 is displayed based on these determination results. The notification screen 70 is for notifying that printing is not executable due to the setting of the both ends cutting processing and the Z-folding processing. The notification screen 70 includes instruction information 70A for prompting the user to change the setting of the both ends cutting amount and a confirmation screen 70B.

The confirmation screen 70B includes notification information 70C indicating that "printing becomes possible by reducing the both ends cutting amount by approximately 0.1 mm", a setting change button B71 for the both ends cutting amount, a both ends cutting cancel button B72, a Z-folding cancel button B73, and a cancel button B74.

The notification information 70C includes a required change amount (absolute value of the difference=0.1 mm) for the both ends cutting amount.

When the user operates the operation display 18 to press the setting change button B71 for the both ends cutting amount on the confirmation screen 70B, a both ends cutting setting change screen 71 illustrated in FIG. 17 is displayed.

The both ends cutting setting change screen 71 includes a front end cutting amount setting area 71A, a rear end cutting amount setting area 71B, an excess cutting amount display area 71C, notification information 71D, a setting range 71E of the cutting amounts (3) and (4), a Z-foldable setting range 71F, a numerical value inputter 71G, and the like.

The current front end cutting amount is displayed in the front end cutting amount setting area 71A.

The current rear end cutting amount is displayed in the rear end cutting amount setting area 71B.

In the excess cutting amount display area 71C, a value (difference=0.1 mm) obtained by subtracting the maximum value (9.9 mm) of the sum of the front end cutting amount and the rear end cutting amount, at which the Z-folding processing is executable, from the sum (10.0 mm) of the current front end cutting amount and the current rear end cutting amount is displayed.

The notification information 71D includes the fact that the sum of the current front end cutting amount and the current rear end cutting amount exceeds the maximum Z-foldable cutting amount by 0.1 mm.

In the setting range 71E of the cutting amounts (3) and (4), a setting range of the sum of the front end cutting amount and the rear end cutting amount is displayed.

In the Z-foldable setting range 71F, a setting range "3.0 to 9.9 mm" of the sum of the front end cutting amount and the rear end cutting amount at which the Z-folding processing is executable is displayed. For the cutting processing, a cuttable range is limited by a combination with the Z-folding processing.

The numerical value inputter 71G is used when the user inputs a numerical value.

From the notification screen 70 and the both ends cutting setting change screen 71, the user can know that both the Z-folding processing and the printing processing become possible by changing the both ends cutting amount and know the range of the sum of the front end cutting amount and the rear end cutting amount at which the Z-folding processing is executable and the difference between the sum of the current cutting amounts and the threshold value of the sum of the cutting amounts at which the Z-folding processing is executable.

The user operates the operation display 18 to reduce the front end cutting amount so that the sum of the front end cutting amount and the rear end cutting amount is equal to or less than 9.9 mm. Specifically, the front end cutting amount may be reduced by 0.1 mm or more from the current state.

As described above, according to the first embodiment, in a case where it is determined that at least two set post-processes are not executable, when the post-processing setting corresponding to one post-processing is a setting including numerical value input, notification regarding a numerical value input setting change in the post-processing setting corresponding to the one post-processing is provided. Therefore, when there is a prohibition relationship between a plurality of set post-processes, it is possible to propose an appropriate prohibition releasing method. For example, it is possible to notify the user that the prohibition can be canceled by changing the numerical value, or display a screen for numerical value setting, or present a setting range in which the prohibition can be released, or prompt the user to change the numerical value.

In particular, in the case of executing a plurality of post-processes including cutting processing for cutting the paper and other post-processes, it is possible to prompt an appropriate prohibition releasing method.

In a case where the absolute value of the difference between the current set value in the post-processing setting corresponding to one post-processing and the set value at which at least two post-processes are executable is equal to or less than a predetermined value, notification regarding a numerical value input setting change is provided, so that it is possible to propose changing the numerical value only when the change amount of the set value is equal to or less than the predetermined value. On the other hand, if the absolute value of the difference is greater than the predetermined value, no notification regarding a numerical value input setting change is provided. As a result, it is possible to prevent a setting change significantly different from the user's intention.

By notifying the user of the difference between the current set value in the post-processing setting corresponding to one post-processing and the set value at which at least two post-processes are executable, it is possible to notify how much the numerical value needs to be changed.

In particular, in a case where one post-processing is both ends cutting processing for cutting both ends of image-formed paper, the paper width or the paper length after both ends cutting processing is determined by the sum of the cutting amounts of both ends of the paper. Therefore, when the absolute value of the difference between the sum of the current cutting amounts and the sum of the cutting amounts at which at least two post-processes are executable is equal to or less than a predetermined value, it is possible to provide notification regarding a numerical value input setting change for the cutting amounts corresponding to both ends.

When the paper size after both ends cutting processing for making post-processing set together with the both ends cutting processing executable is a standard paper size, the change in the cutting amount can be easily communicated to the user by prompting the user to change the numerical value in the post-processing setting corresponding to the both ends cutting processing so that the paper size after the both ends cutting processing becomes the standard paper size.

In the first embodiment, a case where one post-processing is both ends cutting processing or four sides cutting processing has been described. However, the invention can also be applied to one end cutting processing for cutting one end of the paper. Specifically, when the cutting amount of one of both ends of the paper is 0, one-end cutting processing is applied. When one-end cutting processing is set as one post-processing of at least two post-processes and it is determined that at least two set post-processes are not executable, the CPU 11 provides notification regarding a numerical value input setting change in the post-processing setting corresponding to the one-end cutting processing.

The determination in step S5 in the basic process illustrated in FIG. 5 is not essential, and the process may proceed to step S6 in the case of YES in step S4.

Second Embodiment

Next, a second embodiment to which the invention is applied will be described.

Since an image forming system according to the second embodiment has the same configuration as the image forming system 100 according to the first embodiment, FIGS. 1 and 2 are used, and the illustration and description of the configuration will be omitted. Hereinafter, the characteristic configuration and processing of the second embodiment will be described.

In the first embodiment, when it is determined that a plurality of set post-processes are not executable, the user is prompted to change the numerical value. In the second embodiment, however, when it is determined that a plurality of set post-processes are not executable, the set value is automatically changed so that the plurality of set post-processes are executable.

In a case where one post-processing of at least the two set post-processes is both ends cutting processing for cutting both ends of image-formed paper and it is determined that at least two post-processes are not executable, when the absolute value of the difference between the sum of the current cutting amounts and the sum of the cutting amounts, at which at least the two post-processes are executable, for the sum of the cutting amounts corresponding to both ends is equal to or less than a predetermined value, the CPU 11 divides the absolute value of the difference by 2, adds or subtracts the value obtained by the division so that at least the two post-processes are executable on the cutting amounts corresponding to both ends, and notifies that the cutting amounts corresponding to both the ends have been automatically changed.

Whether or not the value obtained by the division is added to or subtracted from the current cutting amounts corresponding to both ends is determined so as to be adjusted in a direction approaching the sum of the cutting amounts at which at least the two post-processes are executable.

Hereinafter, a case where both ends cutting processing along the transport direction is set as cutting processing will be described as an example.

Figure 18:
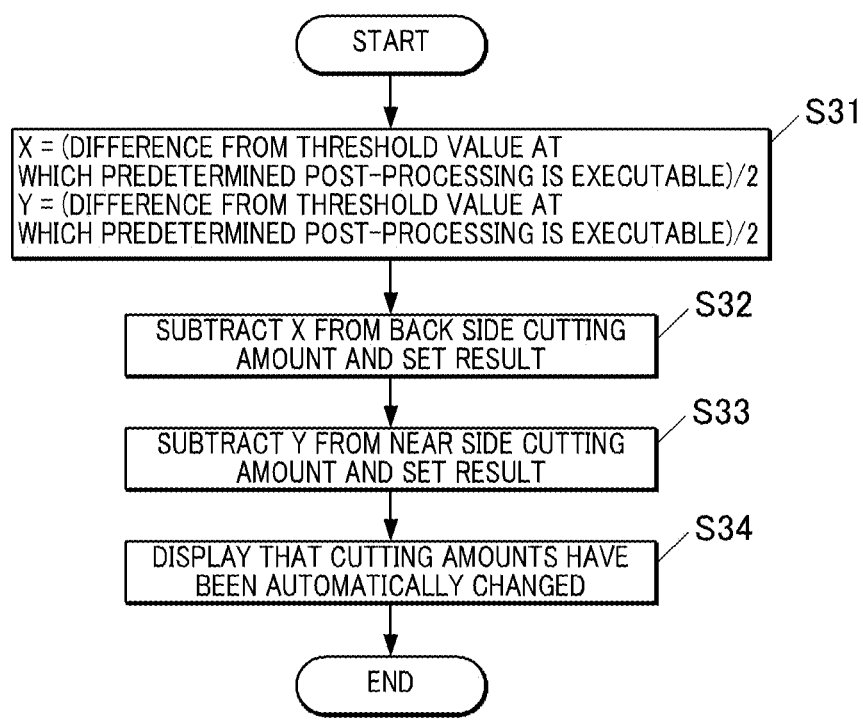
FIG. 18 is a flowchart illustrating a first cutting amount automatic adjustment process according to a second embodiment.

FIG. 18 is a flowchart illustrating a first cutting amount automatic adjustment process. The first cutting amount automatic adjustment process is executed when, in the basic process illustrated in FIG. 5, a plurality of set post-processes are not executable (step S3; NO), cutting is included in the plurality of post-processing settings (step S4; YES), and the absolute value of the difference between the sum of the current cutting amounts and the sum (threshold value) of the cutting amounts, at which predetermined post-processing (post-processing other than cutting) is executable, for the sum of the cutting amounts corresponding to both ends of the paper is equal to or less than a predetermined value (step S5; YES).

The CPU 11 divides the difference from the threshold value, at which the predetermined post-processing is executable, by 2 (step S31). As the difference, the value acquired in step S20 is used. The values obtained by dividing the difference by 2 are defined as X and Y.

X=(Difference from threshold value at which predetermined post-processing is executable)/2

Y=(Difference from threshold value at which predetermined post-processing is executable)/2

Then, the CPU 11 subtracts X from the current back side cutting amount, and sets the result as a new back side cutting amount (step S32).

Then, the CPU 11 subtracts Y from the current near side cutting amount, and sets the result as a new near side cutting amount (step S33).

Then, the CPU 11 causes the operation display 18 to display that automatic changes to obtain the cutting amounts at which the predetermined post-processing is executable have been made (step S34).

As described above, the first cutting amount automatic adjustment process ends.

A value obtained by subtracting the "sum of the cutting amounts at which the predetermined post-processing is executable" from the "sum of the current cutting amounts" is calculated as the "difference". If the "difference" is a positive value, subtracting X from the "current back side cutting amount" corresponds to subtracting the "value obtained by dividing the absolute value of the difference by 2" from the "current back side cutting amount". On the other hand, if the "difference" is a negative value, subtracting X from the "current back side cutting amount" corresponds to adding the "value obtained by dividing the absolute value of the difference by 2" to the "current back side cutting amount". However, if the "difference" is a negative value, since the predetermined post-processing is executable with that setting, the cutting amount is not automatically changed.

Figure 19:
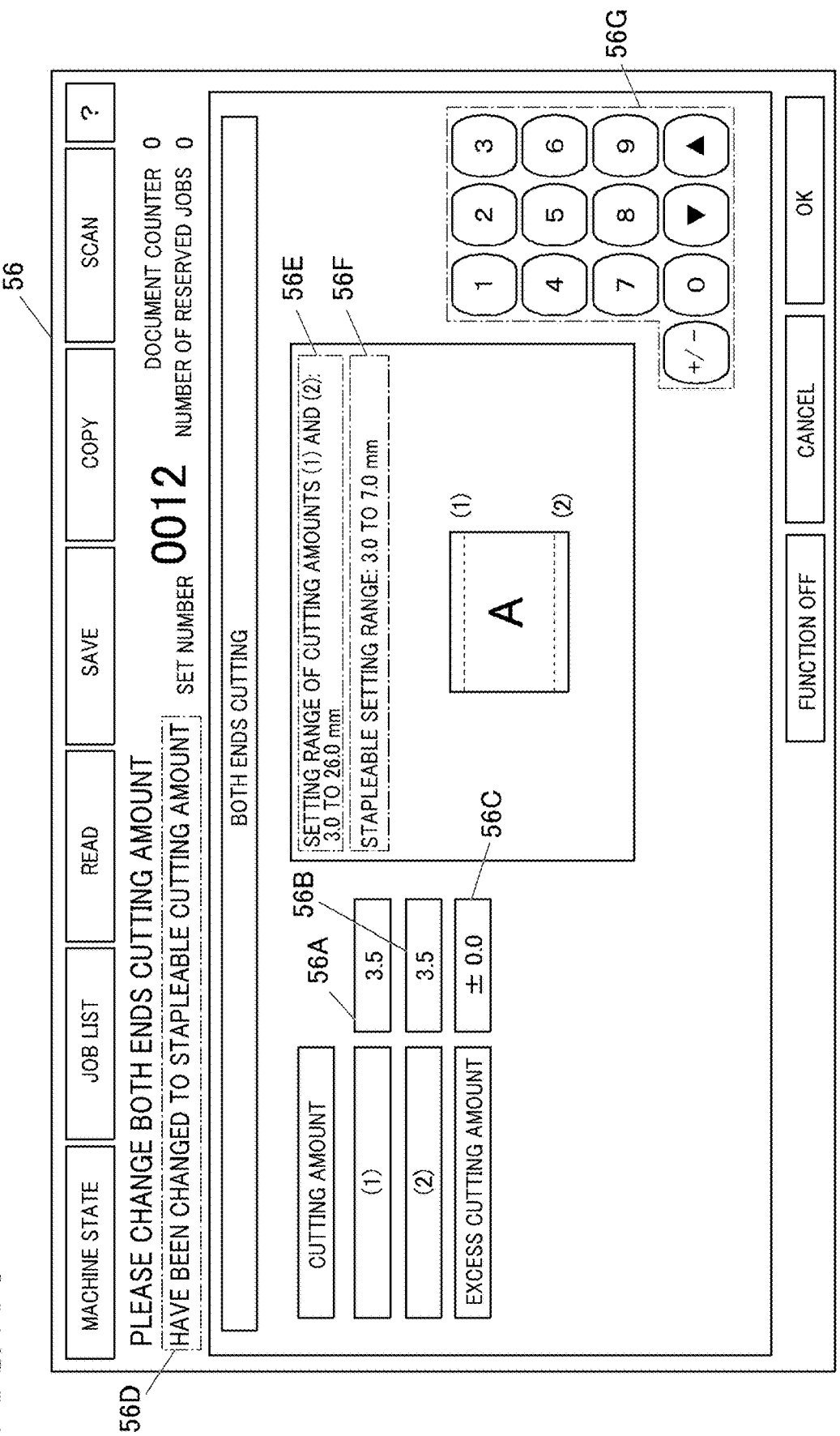
FIG. 19 is an example of a both ends cutting setting automatic change screen.

When the back side cutting amount is set to 5.0 mm and the near side cutting amount is set to 5.0 mm on the both ends cutting setting screen 52 illustrated in FIG. 10 and "left corner" is set as corner staple on the staple setting screen 53 illustrated in FIG. 11, the difference between the sum (10.0 mm) of the current cutting amounts and the maximum value (7.0 mm) of the sum of the cutting amounts at which stapling processing is executable is "3.0 mm", as described in the first embodiment. When the user operates the operation display 18 to press the OK button B31 on the staple setting screen 53, a both ends cutting setting automatic change screen 56 illustrated in FIG. 19 is displayed.

The both ends cutting setting automatic change screen 56 is a screen after automatic changes to obtain the cutting amounts in a range compatible with the stapling processing have been made. It is also possible to perform the cutting amount change input again on the both ends cutting setting automatic change screen 56.

The both ends cutting setting automatic change screen 56 includes a back side cutting amount setting area 56A, a near side cutting amount setting area 56B, an excess cutting amount display area 56C, notification information 56D, a setting range 56E of the cutting amounts (1) and (2), a stapleable setting range 56F, a numerical value inputter 56G, and the like.

The automatically changed back side cutting amount is displayed in the back side cutting amount setting area 56A. Specifically, a value "3.5 mm" obtained by subtracting 1.5 mm, which is obtained by dividing the excess cutting amount (3.0 mm) by 2, from the original back side cutting amount (5.0 mm).

The automatically changed near side cutting amount is displayed in the near side cutting amount setting area 56B. Specifically, a value "3.5 mm" obtained by subtracting 1.5 mm, which is obtained by dividing the excess cutting amount (3.0 mm) by 2, from the original near side cutting amount (5.0 mm).

The excess cutting amount displayed in the excess cutting amount display area 56C is "±0.0 mm" due to automatic changes in the back side cutting amount and the near side cutting amount.

The notification information 56D includes the fact that changes to obtain the stapleable cutting amounts have been made.

The setting range 56E of the cutting amounts (1) and (2), the stapleable setting range 56F, and the numerical value inputter 56G are the same as the setting range 55E of the cutting amounts (1) and (2), the stapleable setting range 55F, and the numerical value inputter 55G on the both ends cutting setting change screen 55 illustrated in FIG. 13.

As described above, according to the second embodiment, in a case where a plurality of post-processes including both ends cutting processing are set and it is determined that the post-processes are not executable, when the absolute value of the difference between the sum of the current cutting amounts and the sum of the cutting amounts at which the post-processes are executable is equal to or less than the predetermined value, the absolute value of the difference is divided by 2, the value obtained by the division is added to or subtracted from the cutting amounts corresponding to both ends, and it is notified that the cutting amounts corresponding to both the ends have been automatically changed. Therefore, when there is a prohibition relationship between a plurality of set post-processes, automatic changes to obtain the set value to release the prohibition are made, so that it is possible to propose an appropriate prohibition releasing method.

In FIG. 18, the difference from the threshold value at which the predetermined post-processing is executable is divided by 2 (X=Y). However, the ratio between the amount of change X with respect to the back side cutting amount and the amount of change Y with respect to the near side cutting amount is not limited to the above example.

For example, when performing adjustment by allocating the absolute value of the difference between the sum of the current cutting amounts and the sum of the cutting amounts at which at least two post-processes are executable to each of the cutting amounts corresponding to both ends of the paper, the CPU 11 divides the absolute value of the difference according to the current ratio between the current cutting amounts corresponding to both the ends.

In this case, X and Y may be calculated by the following equations instead of step S31.

X=(Difference from threshold value at which predetermined post-processing is executable)/(Back side cutting amount+Near side cutting amount)× Back side cutting amount Y=(Difference from threshold value at which predetermined post-processing is executable)/(Back side cutting amount+Near side cutting amount)× Near side cutting amount.

When performing adjustment by allocating the absolute value of the difference to each of the cutting amounts corresponding to both ends of the paper, the absolute value of the difference may be divided by the ratio between margin amounts in image formation set for respective sides corresponding to both the ends.

Third Embodiment

Next, a third embodiment to which the invention is applied will be described.

Since an image forming system according to the third embodiment has the same configuration as the image forming system 100 according to the first embodiment, FIGS. 1 and 2 are used, and the illustration and description of the configuration will be omitted. Hereinafter, the characteristic configuration and processing of the third embodiment will be described.

When it is determined that at least two post-processes are not executable due to the change of the numerical value setting of one of the cutting amounts corresponding to both ends of the paper in the cutting processing, the CPU 11 changes the numerical value setting of the other one of the cutting amounts corresponding to both the ends to a numerical value at which at least two post-processes are executable, and notifies that the other numerical value setting has been automatically changed.

That is, in the third embodiment, when one of the cutting amounts corresponding to both ends is changed, the other cutting amount is automatically changed.

Hereinafter, a case where both ends cutting processing along the transport direction is set as cutting processing will be described as an example.

Figure 20:
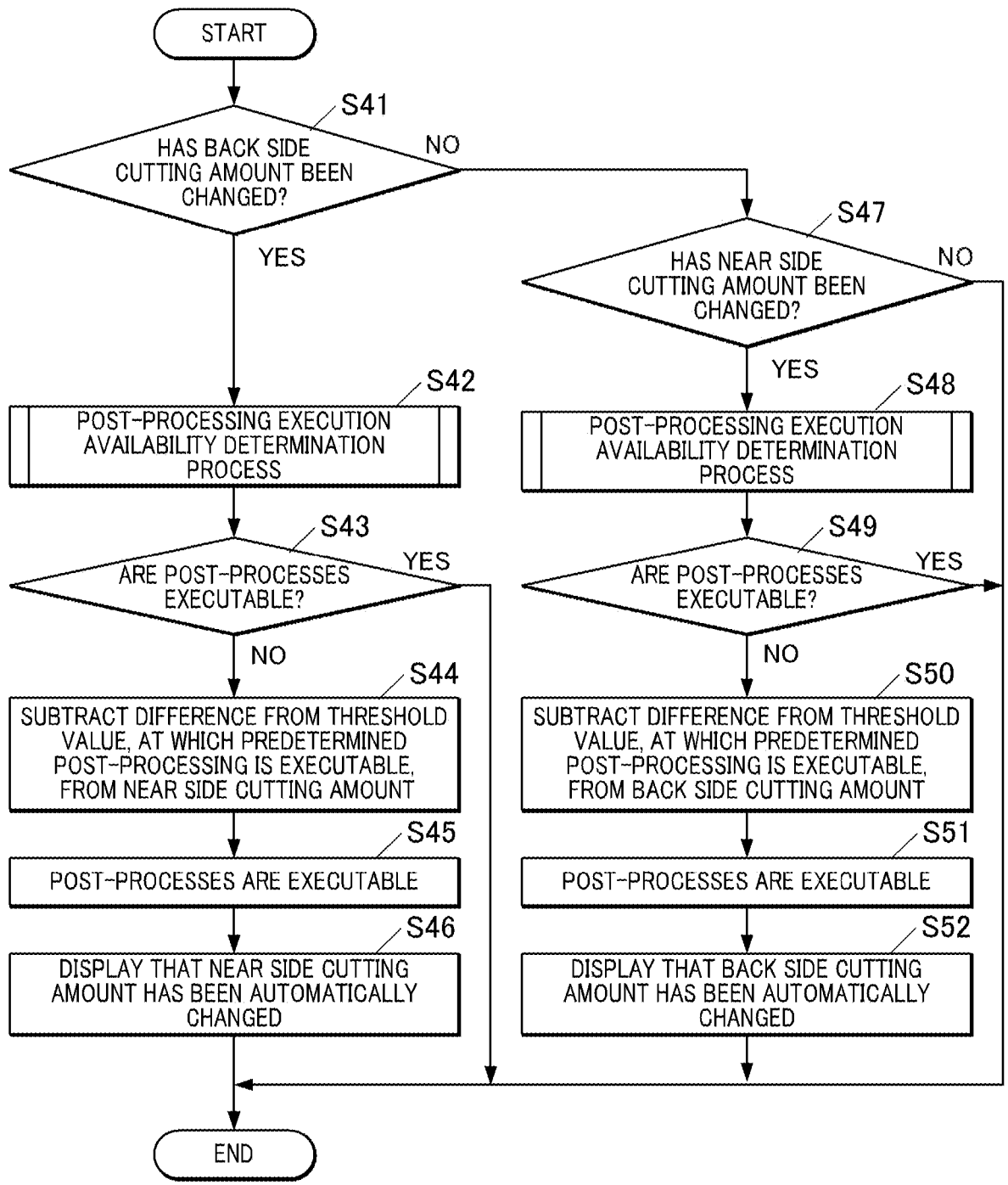
FIG. 20 is a flowchart illustrating a second cutting amount automatic adjustment process according to a third embodiment.

FIG. 20 is a flowchart illustrating a second cutting amount automatic adjustment process. The second cutting amount automatic adjustment process is executed after the first cutting amount automatic adjustment process (refer to FIG. 18).

The CPU 11 determines whether or not the setting of the back side cutting amount has been changed by the user's operation on the operation display 18 (step S41). If the setting of the back side cutting amount has been changed (step S41; YES), the CPU 11 executes a post-processing execution availability determination process (refer to FIG. 6) (step S42).

Then, the CPU 11 determines whether or not the plurality of set post-processes are executable (step S43). If the plurality of set post-processes are not executable (step S43; NO), the CPU 11 subtracts a difference from the threshold value, at which predetermined post-processing (post-processing other than cutting) is executable, from the near side cutting amount (step S44). As the difference, the value acquired in step S20 in the post-processing execution availability determination process executed in step S42 is used.

Then, the CPU 11 changes the determination result to a determination result illustrating that the plurality of set post-processes are executable (step S45).

Then, the CPU 11 causes the operation display 18 to display that the near side cutting amount has been automatically changed to a numerical value at which the predetermined post-processing is executable (step S46).

If the setting of the back side cutting amount has not been changed in step S41 (step S41; NO), the CPU 11 determines whether or not the setting of the near side cutting amount has been changed by the user's operation on the operation display 18 (step S47). If the setting of the near side cutting amount has been changed (step S47; YES), the CPU 11 executes the post-processing execution availability determination process (refer to FIG. 6) (step S48).

Then, the CPU 11 determines whether or not the plurality of set post-processes are executable (step S49). If the plurality of set post-processes are not executable (step S49; NO), the CPU 11 subtracts a difference from the threshold value, at which predetermined post-processing is executable, from the back side cutting amount (step S50). As the difference, the value acquired in step S20 in the post-processing execution availability determination process executed in step S48 is used.

Then, the CPU 11 changes the determination result to a determination result illustrating that the plurality of set post-processes are executable (step S51).

Then, the CPU 11 causes the operation display 18 to display that the back side cutting amount has been automatically changed to a numerical value at which the predetermined post-processing is executable (step S52).

The second cutting amount automatic adjustment process ends if the plurality of set post-processes are executable in step S43 (step S43; YES), or if the plurality of set post-processes are executable in step S49 (step S49; YES), or if the setting of the near side cutting amount has not been changed in step S47 (step S47; NO), or after step S46 or step S52.

Figure 21:
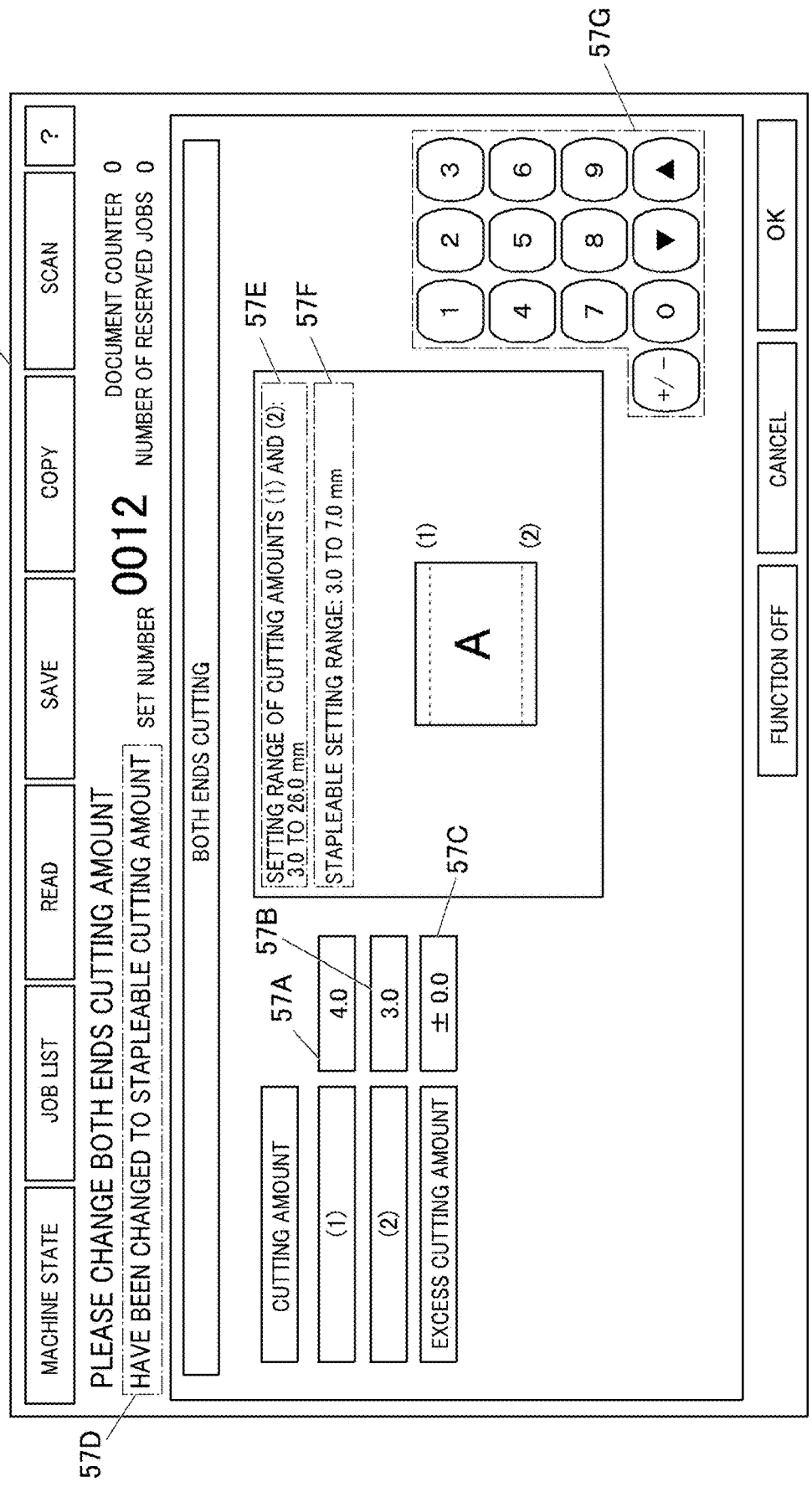
FIG. 21 is an example of a both ends cutting setting automatic change screen.

For example, when the back side cutting amount is changed from 3.5 mm to 4.0 mm on the both ends cutting setting automatic change screen 56 illustrated in FIG. 19, a both ends cutting setting automatic change screen 57 illustrated in FIG. 21 is displayed.

The both ends cutting setting automatic change screen 57 is a screen after the other cutting amount is automatically changed when the stapling processing is not executable due to a change in one cutting amount in the both ends cutting processing.

The both ends cutting setting automatic change screen 57 includes a back side cutting amount setting area 57A, a near side cutting amount setting area 57B, an excess cutting amount display area 57C, notification information 57D, a setting range 57E of the cutting amounts (1) and (2), a stapleable setting range 57F, a numerical value inputter 57G, and the like.

The back side cutting amount (4.0 mm) changed by the user is displayed in the back side cutting amount setting area 57A.

The difference between the sum (4.0 mm+3.5 mm=7.5 mm) of the changed back side cutting amount and the currently set near side cutting amount and the maximum value (7.0 mm) of the sum of the cutting amounts at which the stapling processing is executable is "0.5 mm".

The automatically changed near side cutting amount is displayed in the near side cutting amount setting area 57B. Specifically, a value "3.0 mm" obtained by subtracting the difference (0.5 mm) from the original near side cutting amount (3.5 mm) is displayed.

The excess cutting amount displayed in the excess cutting amount display area 57C is "±0.0 mm" due to an automatic change in the near side cutting amount according to a manual change in the back side cutting amount.

The notification information 57D includes the fact that changes to obtain the stapleable cutting amounts have been made.

The setting range 57E of the cutting amounts (1) and (2), the stapleable setting range 57F, and the numerical value inputter 57G are the same as the setting range 55E of the cutting amounts (1) and (2), the stapleable setting range 55F, and the numerical value inputter 55G on the both ends cutting setting change screen 55 illustrated in FIG. 13.

As described above, according to the third embodiment, in a case where it is determined that at least two post-processes are not executable due to changing the numerical value setting of one of the cutting amounts corresponding to both ends of the paper, the numerical value setting of the other one of the cutting amounts corresponding to both the ends is changed to a numerical value at which at least two post-processes are executable, and it is notified that the numerical value setting of the other cutting amount has been automatically changed. Therefore, when there is a prohibition relationship between a plurality of set post-processes, automatic changes to obtain the set value to release the prohibition are made, so that it is possible to propose an appropriate prohibition releasing method.

For example, in a case where the post-processing is not executable due to a change in one cutting amount (for example, the back side cutting amount) in the both ends cutting processing, the other cutting amount (for example, the near side cutting amount) is automatically changed, so that the post-processing can be executed.

The description in each of the above embodiments is an example of the image forming system according to the invention, and the invention is not limited thereto. The detailed configuration and detailed operation of each apparatus configuring the system can also be appropriately changed without departing from the spirit of the invention.

For example, the characteristic processes of the above embodiments may be combined.

In each of the embodiments described above, when another post-processing is executed after the cutting processing, it is determined whether or not another post-processing is executable on the cut paper. However, it may be determined whether or not there is a prohibition relationship between post-processing other than cutting and cutting processing executed thereafter. For example, in the case of a processing order in which the cutting processing is executed after the stapling processing, it should be prohibited to cut off a staple portion in the cutting processing. Therefore, the prohibition conditions are set in advance so as to determine whether or not post-processing is executable based on the relationship between the staple position in the stapling processing and the cutting amount in the cutting processing.

In each of the embodiments described above, cutting processing has been described as an example of post-processing in which post-processing settings include numerical value input. However, post-processing in which post-processing settings include numerical value input is not limited thereto.

In the screen examples in the embodiments described above, the case where two post-processes are executed has been described, but the invention can also be applied to a case where three or more post-processes are executed.

In the above description, an example is described in which a ROM is used as a computer-readable medium that stores a program for executing each process. However, the invention is not limited to this example. As other computer-readable media, a non-volatile memory, such as a flash memory, and a portable recording medium, such as a CD-ROM, can also be applied. A carrier wave may be applied as a medium for providing program data through a communication line.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system, comprising:
   an image forming apparatus;
   a post-processing apparatus that includes post-processors corresponding to at least two post-processes and perform the at least two post-processes stepwise on paper on which an image is formed by the image forming apparatus;

a setting receiver that receives post-processing settings corresponding to the at least two post-processes; and a hardware processor that determines whether or not the at least two post-processes are executable based on the post-processing settings corresponding to the at least two post-processes and that, in a case where it is determined that the at least two post-processes are not executable, when a post-processing setting corresponding to one of the at least two post-processes is a setting including numerical value input, provides notification regarding a numerical value input setting change in the post-processing setting corresponding to the one post-processing;

wherein when an absolute value of a difference between a current set value in the post-processing setting corresponding to the one post-processing and a set value at which the at least two post-processes are executable, is equal to or less than a predetermined value, the hardware processor provides notification regarding the numerical value input setting change.

2. The image forming system according to claim 1, wherein, as the notification regarding the numerical value input setting change, the hardware processor prompts a user to change a numerical value in the post-processing setting corresponding to the one post-processing.

3. The image forming system according to claim 1, wherein, as the notification regarding the numerical value input setting change, the hardware processor notifies a user of a difference between a current set value in the post-processing setting corresponding to the one post-processing and a set value at which the at least two post-processes are executable.

4. The image forming system according to claim 1, wherein the one post-processing is cutting processing for cutting at least one end of the image-formed paper, and the hardware processor provides notification regarding a numerical value input setting change in a post-processing setting corresponding to the cutting processing when it is determined that the at least two post-processes are not executable.

5. The image forming system according to claim 1, wherein the one post-processing is both ends cutting processing for cutting both ends of the image-formed paper, and the hardware processor provides notification regarding a numerical value input setting change in a post-processing setting corresponding to the both ends cutting processing when it is determined that the at least two post-processes are not executable.

6. The image forming system according to claim 5, wherein, in a case where it is determined that the at least two post-processes are not executable, when an absolute value of a difference between a sum of current cutting amounts and a sum of cutting amounts, at which the at least two post-processes are executable, for a sum of cutting amounts corresponding to both the ends is equal to or less than a predetermined value, the hardware processor provides notification regarding a numerical value input setting change for the cutting amounts corresponding to both the ends.

7. The image forming system according to claim 5, wherein, as the notification regarding the numerical value input setting change, the hardware processor notifies a user of a difference between a sum of current cutting amounts and a sum of cutting amounts, at which the at least two post-processes are executable, for a sum of cutting amounts corresponding to both the ends.

8. The image forming system according to claim 5, wherein, in a case where it is determined that the at least two post-processes are not executable, when a paper size after the both ends cutting processing for making the at least two post-processes executable is a standard paper size, the hardware processor prompts a user to change a numerical value in the post-processing setting corresponding to the both ends cutting processing so that the paper size after the both ends cutting processing becomes the standard paper size.

9. The image forming system according to claim 5, wherein, in a case where it is determined that the at least two post-processes are not executable, when an absolute value of a difference between a sum of current cutting amounts and a sum of cutting amounts, at which the at least two post-processes are executable, for a sum of cutting amounts corresponding to both the ends is equal to or less than a predetermined value, the hardware processor divides the absolute value of the difference by 2 or divides the absolute value of the difference by a ratio between current cutting amounts corresponding to both the ends or a ratio between margin amounts in image formation set for respective sides corresponding to both the ends, adds or subtracts a value obtained by the division to or from the cutting amounts corresponding to both the ends so that the at least two post-processes are executable, and notifies that the cutting amounts corresponding to both the ends have been automatically changed.

10. The image forming system according to claim 5, wherein, when it is determined that the at least two post-processes are not executable due to change of a numerical value setting of one of cutting amounts corresponding to both the ends, the hardware processor changes a numerical value setting of the other one of the cutting amounts corresponding to both the ends to a numerical value at which the at least two post-processes are executable, and notifies that the other numerical value setting has been automatically changed.

11. A post-processing determination method in an image forming system including an image forming apparatus and a post-processing apparatus that includes post-processors corresponding to at least two post-processes and perform the at least two post-processes stepwise on paper on which an image is formed by the image forming apparatus, the method comprising:

receiving post-processing settings corresponding to the at least two post-processes;

determining whether or not the at least two post-processes are executable based on the post-processing settings corresponding to the at least two post-processes; and in a case where it is determined that the at least two post-processes are not executable, when a post-processing setting corresponding to one of the at least two post-processes is a setting including numerical value input, providing notification regarding a numerical value input setting change in the post-processing setting corresponding to the one post-processing;

wherein when an absolute value of a difference between a current set value in the post-processing setting corresponding to the one post-processing and a set value at which the at least two post-processes are executable, is equal to or less than a predetermined value, the notification regarding the numerical value input setting change is provided.

* * * * *